United States Patent [19]
Kammeter

[11] Patent Number: 5,434,455
[45] Date of Patent: Jul. 18, 1995

[54] HARMONIC CANCELLATION SYSTEM

[75] Inventor: John B. Kammeter, Richmond, Va.

[73] Assignee: Power Distribution, Inc., Richmond, Va.

[21] Appl. No.: 286,412

[22] Filed: Aug. 5, 1994

Related U.S. Application Data

[63] Continuation-in-part of Ser. No. 196,813, Feb. 14, 1994, Pat. No. 5,343,080, which is a continuation of Ser. No. 992,061, Dec. 16, 1992, abandoned, which is a continuation-in-part of Ser. No. 792,893, Nov. 15, 1991, Pat. No. 5,206,539.

[51] Int. Cl.⁶ .............................................. H02J 3/01
[52] U.S. Cl. ...................................... 307/105; 336/5
[58] Field of Search ............... 307/17, 85, 105; 336/5, 336/10, 12; 323/361, 215; 333/177, 178, 179

[56] References Cited

U.S. PATENT DOCUMENTS

| | | | |
|---|---|---|---|
| 1,719,892 | 7/1929 | Kubler . | |
| 2,025,584 | 12/1935 | Gerald | 171/119 |
| 2,307,527 | 1/1943 | Maslin et al. | 172/238 |
| 2,470,598 | 5/1949 | Biebesheimer | 175/361 |
| 2,482,489 | 9/1949 | Kaiser . | |
| 2,790,131 | 4/1957 | Nyyssonen | 321/57 |
| 3,295,050 | 12/1966 | Rowan, Jr. et al. | 321/68 |
| 3,379,961 | 4/1968 | Kobayashi et al. | 323/76 |
| 3,500,166 | 3/1970 | Mesenhimer et al. | 321/11 |
| 3,555,291 | 1/1971 | Dewey | 307/105 |
| 3,601,690 | 8/1971 | Judson et al. | 323/48 |
| 3,671,901 | 6/1972 | Lys | 336/5 |
| 3,711,760 | 1/1973 | Kaiser | 321/5 |
| 3,742,251 | 6/1973 | Thompson et al. | 307/242 |
| 3,792,286 | 2/1974 | Meier | 307/58 |
| 3,796,890 | 3/1974 | Thompson et al. | 307/24 |
| 3,859,542 | 1/1975 | Kennedy | 307/88 R |
| 3,913,005 | 10/1975 | Cook | 321/68 |
| 3,916,246 | 10/1975 | Preist | 315/5 |
| 3,970,914 | 7/1976 | Salzmann et al. | 321/2 |
| 3,991,359 | 11/1976 | Thompson et al. | 323/4 |
| 4,074,343 | 2/1978 | Chaussy et al. | 363/14 |
| 4,106,089 | 8/1978 | Fettinger | 363/153 |
| 4,112,403 | 9/1978 | Friedlander | 336/12 |
| 4,209,757 | 6/1980 | Becker | 333/17 R |

(List continued on next page.)

FOREIGN PATENT DOCUMENTS

| | | |
|---|---|---|
| 54-125434 | 9/1979 | Japan . |
| 920990 | 4/1982 | Russian Federation . |
| 112829 | 1/1918 | United Kingdom . |
| 495370 | 8/1937 | United Kingdom . |
| 474209 | 10/1937 | United Kingdom . |
| 725290 | 3/1955 | United Kingdom . |
| 964118 | 7/1964 | United Kingdom . |
| 771820 | 10/1980 | U.S.S.R. . |

OTHER PUBLICATIONS

D. G. Fink and H. W. Beaty, *Standard Handbook for Electrical Engineers*, pp. 10–11.

The Institute of Electrical and Electronics Engineers, Inc., *The New IEEE Standard Dictionary of Electrical and Electronics Terms*, 1993, New York.

Blume et al., *Transformer Engineering*, 1938, pp. 171, 213–217, New York.

(List continued on next page.)

*Primary Examiner*—Jeffrey A. Gaffin
*Attorney, Agent, or Firm*—Bacon & Thomas

[57] ABSTRACT

A harmonic current filtering transformer includes a three-phase input winding and at least two wye-connected three-phase output windings. Windings for each of the phases includes an in-phase coil connected between a common neutral and vector coils for each of the other two phases, the output windings thereby being phase shifted relative to each other by an amount which causes harmonic currents generated by a non-linear load to magnetically cancel in the transformer core. The harmonic current filtering transformer may be used as part of a harmonic cancelling power system which includes multiple linear and nonlinear loads, and protective devices, switches, filters and other components on both the input and output sides of the transformer as in a conventional power system since the harmonic cancelling transformer does not require additional secondary windings or other electrical components previously thought necessary to achieve harmonic cancellation.

60 Claims, 28 Drawing Sheets

U.S. PATENT DOCUMENTS

| | | | |
|---|---|---|---|
| 4,305,033 | 12/1981 | Powell | 323/306 |
| 4,384,214 | 5/1983 | Crick et al. | 307/66 |
| 4,513,240 | 4/1985 | Putman | 323/210 |
| 4,513,243 | 4/1985 | Novak et al. | 323/361 |
| 4,517,471 | 5/1985 | Sachs | 307/67 |
| 4,531,085 | 7/1985 | Mesenhimer | 323/214 |
| 4,544,877 | 10/1985 | Powell | 323/308 |
| 4,567,423 | 1/1986 | Dobsa et al. | 322/58 |
| 4,651,265 | 3/1987 | Stacey et al. | 363/35 |
| 4,678,297 | 7/1987 | Stein et al. | 307/104 |
| 4,684,875 | 8/1987 | Powell | 323/204 |
| 4,689,735 | 8/1987 | Young | 363/155 |
| 4,736,090 | 4/1988 | De Broeck et al. | 219/497 |
| 4,779,181 | 10/1988 | Traver et al. | 363/154 |
| 4,812,669 | 3/1989 | Takeda et al. | 307/105 |
| 4,858,100 | 8/1989 | Tatara | 363/161 |
| 4,862,059 | 8/1989 | Tominaga et al. | 323/307 |
| 4,890,213 | 12/1989 | Seki | 363/49 |
| 4,893,069 | 1/1990 | Harada et al. | 323/215 |
| 4,922,124 | 5/1990 | Seki et al. | 307/87 |
| 4,939,486 | 7/1990 | Bergdahl et al. | 333/175 |
| 4,953,071 | 8/1990 | Lipman | 363/72 |
| 4,964,012 | 10/1990 | Kitagawa | 361/113 |
| 5,003,277 | 3/1991 | Sokai et al. | 336/10 |
| 5,063,487 | 11/1991 | Johnson et al. | 363/3 |
| 5,070,441 | 12/1991 | Ashley | 363/154 |
| 5,107,410 | 4/1992 | Marsh et al. | 363/2 |
| 5,166,597 | 11/1992 | Larsen et al. | 323/215 |
| 5,172,009 | 12/1992 | Mohan | 307/46 |
| 5,206,539 | 4/1993 | Kammeter | 307/105 |
| 5,224,029 | 6/1993 | Newman, Jr. | 363/48 |
| 5,235,503 | 8/1993 | Stemmler et al. | 363/37 |
| 5,343,080 | 8/1994 | Kammeter | 307/105 |

OTHER PUBLICATIONS

Ordean Kiltie, *Design Shortcuts & Procedures for Electronics Power Transformers & Inductors*, 1975, Ohio.

Johannes Schaefer, *Rectifier Circuits: Theory and Design*, 1965, pp. 58–67, New York.

Intertec Communications, Inc., *Power Quality '89 USA Official Proceedings of the First International Power Quality Conference*, 1989, pp. 324–337, California.

Alex Levran and Robert H. Lee, handout from course or lecture at UCLA "Power Electronic Circuits: Theory and Practice," Jan. 29–Feb. 2, year unknown.

Dept. of Electrical Engineering at MIT, "Magnetic Circuits and Transformers," pp. 564–586 and 656–672, date unknown.

R. H. Lee, *Power Quality*, "Eliminating Harmonic Currents Using Transformers," Sep./Oct. 1991, pp. 33–37.

R. H. Lee, *Power Quality*, "Eliminating Harmonic Currents Using Transformers," Oct., 1989.

IBM Specifications, "Input Power Specifications," IBM 1990, 1991.

R. H. Lee, "Line Current Harmonics Effects on Transformers," Jul. 18, 1991.

A. F. Puchstein et al., *Alternating Current Machines*, 1948, New York.

P. Wood, *Switching Power Converters*, 1981, New York.

R. G. Hoft, *Principles of Inverter Circuits*, 1981, New York.

Teledyne Specifications, "Shielded Isolation Harmonic Canceller".

K. Marsh, "Poly-Phase Power Sources Switching Power Supply Office Equipment," Jul. 17, 1991.

Power Distribution specifications "Powerpak AK 9000/4 Harmonic Cancellation," Sep. 1, 1991.

B. D. Bedford and R. G. Hoft, *Principles of Inverter Circuits*, 1964, New York.

I. K. Dortort "Phase Shifting of Harmonics in AC Circuits of Rectifiers," IEEE, Nov./Dec. 1968.

H. Winograd and J. B. Rice, "Conversion of Electric Power," *Standard Handbook for Electrical Engineers*, McGraw-Hill, New York, pp. 12-2 to 12-39.

"Compensation of Static Power Converters," *IEEE Guide for Harmonic Control and Reactive*, pp. 35–44.

Ordean Kiltie, *Design Shortcuts & Procedures for Electronics Power Transformers & Inductors*, pp. 55–64.

J. C. Reed, *The Calculation of Rectifier and Inverter Performance Characteristics*, IEE Journal, vol. 92, Pt. II (1945).

W. Tucker, *Laboratory Investigations of a Nine-Phase Zigzag-Connected Power Transformer for Electrical System Harmonic Current Reduction*, Feb. 1986.

L. Walker, *10 MTW GTO Converter for Battery Peaking Service*, 1988 IEEE.

J. W. A. Wilson, *Double Bridge Inverters with Magnetic Coupling—Part 1: Voltage Waveforms*, IAS '76 Annual.

J. W. A. Wilson, *Double Bridge Inverters with Magnetic Coupling—Part 2: Current Waveforms*, IAS '76.

"USA Standard Practices and Requirements for Semiconductor Power Rectifiers," IEEE 1968.

(List continued on next page.)

U.S. PATENT DOCUMENTS

N. Chackan, "Nine-Phase Transformer Harmonic Voltage Contribution on Various Electrical System Buses," may 18, 1985, PA.

M. Williams, "System Level Reduction of Line Current Harmonics Caused by Capacitor Input Rectifiers in 3-Phase Systems," (Preliminary Draft) Dec. 15, 1981.

Navy Specification 17221C, 1988.

Navy Specification 17221B, 1986.

Navy Specification 15108D, 1988.

Letter to Mr. C. Y. Lu describing "Teledyne Crittenden ZZ-N1 Zig-Zag transformer" with attachments.

*Standard Handbook for Electrical Engineers,* 11th Ed., Transformers pp. 10–11, FIGS. 10–15 and 10–16.

*IEEE Standard Dictionary of Electrical and Electronics Terms,* 3rd Ed., 1984, p. 1508.

Ling, Engineering Drawing PT-1429 to 23 KW Power Trans. for 3 MF AC Supply DMAC-3B.

Othmar Marti and Harold Winowgrad, Mercury Arc Power Rectifiers, 1930, p. 153.

Title Unknown, IBM, Jun. 1990.

Westinghouse Electric Corp., Proposed Revision to Specification MIL-T-15108C, Preliminary Report, Oct. 31, 1986, PA.

| VECTOR | RELATIVE MAGNITUDE | PHASE ANGLE (degrees) |
|---|---|---|
| X4 | 1 | −15 |
| A | 0.8165 | 0 |
| X1 | 1 | +15 |
| X5 | 1 | +105 |
| B | 0.8165 | +120 |
| X2 | 1 | +135 |
| X6 | 1 | +225 |
| C | 0.8165 | +240 |
| X3 | 1 | +255 |
| A1 | 0.2989 | −60 |
| A2 | 0.2989 | +60 |
| B1 | 0.2989 | +60 |
| B2 | 0.2989 | +180 |
| C1 | 0.2989 | +180 |
| C2 | 0.2989 | −60 |
| X7 | 1 | −7.5 |
| X10 | 1 | +7.5 |
| X8 | 1 | +112.5 |
| X11 | 1 | +127.5 |
| X9 | 1 | +232.5 |
| X12 | 1 | +247.5 |
| $a_1$ | 0.9161 | +0 |
| $b_1$ | 0.9161 | +120 |
| $c_1$ | 0.9161 | +240 |
| A3 | 0.1507 | −60 |
| A4 | 0.1507 | +60 |
| B3 | 0.1507 | +60 |
| B4 | 0.1507 | +180 |
| C3 | 0.1507 | +180 |
| C4 | 0.1507 | −60 |

FIG. 7

OUTPUT #1= −15 ∅ SHIFT;
OUTPUT #2= −45 ∅ SHIFT;

| HARMONIC ORDER | PHASE SEQ | OUTPUT # 1 | | OUTPUT # 2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1 | + | −15 | −15 | −45 | −45 | 2.000 | 1 | 1 |
| 3 | 0 | ** | ** | ** | ** | 0.000 | 0 | 3 |
| 5 | − | −75 | −90 | −225 | −270 | 0.000 | 0 | 5 |
| 7 | + | 105 | −90 | 315 | −270 | 0.000 | 0 | 7 |
| 9 | 0 | ** | ** | ** | ** | 0.000 | 0 | 9 |
| 11 | − | −165 | −180 | −495 | −540 | 2.000 | 1 | 11 |
| 13 | + | 195 | −180 | 585 | −540 | 2.000 | 1 | 13 |
| 15 | 0 | ** | ** | ** | ** | 0.000 | 0 | 15 |
| 17 | − | −255 | −270 | −765 | −810 | 0.000 | 0 | 17 |
| 19 | + | 285 | −270 | 855 | −810 | 0.000 | 0 | 19 |
| 21 | 0 | ** | ** | ** | ** | 0.000 | 0 | 21 |
| 23 | − | −345 | −360 | −1035 | −1080 | 2.000 | 1 | 23 |
| 25 | + | 375 | −360 | 1125 | −1080 | 2.000 | 1 | 25 |
| 27 | 0 | ** | ** | ** | ** | 0.000 | 0 | 27 |
| 29 | − | −435 | −450 | −1305 | −1350 | 0.000 | 0 | 29 |
| 31 | + | 465 | −450 | 1395 | −1350 | 0.000 | 0 | 31 |
| 33 | 0 | ** | ** | ** | ** | 0.000 | 0 | 33 |
| 35 | − | −525 | −540 | −1575 | −1620 | 2.000 | 1 | 35 |
| 37 | + | 555 | −540 | 1665 | −1620 | 2.000 | 1 | 37 |
| 39 | 0 | ** | ** | ** | ** | 0.000 | 0 | 39 |
| 41 | − | −615 | −630 | −1845 | −1890 | 0.000 | 0 | 41 |
| 43 | + | 645 | −630 | 1935 | −1890 | 0.000 | 0 | 43 |
| 45 | 0 | ** | ** | ** | ** | 0.000 | 0 | 45 |
| 47 | − | −705 | −720 | −2115 | −2160 | 2.000 | 1 | 47 |
| 49 | + | 735 | −720 | 2205 | −2160 | 2.000 | 1 | 49 |
| 51 | 0 | ** | ** | ** | ** | 0.000 | 0 | 51 |
| 53 | − | −795 | −810 | −2385 | −2430 | 0.000 | 0 | 53 |
| 55 | + | 825 | −810 | 2475 | −2430 | 0.000 | 0 | 55 |

FIG. 8a

OUTPUT #1= 0 ø SHIFT;
OUTPUT #2= 30 ø SHIFT;

| HARMONIC ORDER | PHASE SEQ | OUTPUT # 1 | | OUTPUT # 2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1 | + | 0 | 0 | 30 | 30 | 2.000 | 1 | 1 |
| 3 | 0 | ** | ** | ** | ** | 0.000 | 0 | 3 |
| 5 | − | 0 | 0 | 150 | 180 | 0.000 | 0 | 5 |
| 7 | + | 0 | 0 | 210 | 180 | 0.000 | 0 | 7 |
| 9 | 0 | ** | ** | ** | ** | 0.000 | 0 | 9 |
| 11 | − | 0 | 0 | −330 | 360 | 2.000 | 1 | 11 |
| 13 | + | 0 | 0 | 390 | 360 | 2.000 | 1 | 13 |
| 15 | 0 | ** | ** | ** | ** | 0.000 | 0 | 15 |
| 17 | − | 0 | 0 | −510 | 540 | 0.000 | 0 | 17 |
| 19 | + | 0 | 0 | 570 | 540 | 0.000 | 0 | 19 |
| 21 | 0 | ** | ** | ** | ** | 0.000 | 0 | 21 |
| 23 | − | 0 | 0 | −690 | 720 | 2.000 | 1 | 23 |
| 25 | + | 0 | 0 | 750 | 720 | 2.000 | 1 | 25 |
| 27 | 0 | ** | ** | ** | ** | 0.000 | 0 | 27 |
| 29 | − | 0 | 0 | −870 | 900 | 0.000 | 0 | 29 |
| 31 | + | 0 | 0 | 930 | 900 | 0.000 | 0 | 31 |
| 33 | 0 | ** | ** | ** | ** | 0.000 | 0 | 33 |
| 35 | − | 0 | 0 | −1050 | 1080 | 2.000 | 1 | 35 |
| 37 | + | 0 | 0 | 1110 | 1080 | 2.000 | 1 | 37 |
| 39 | 0 | ** | ** | ** | ** | 0.000 | 0 | 39 |
| 41 | − | 0 | 0 | −1230 | 1260 | 0.000 | 0 | 41 |
| 43 | + | 0 | 0 | 1290 | 1260 | 0.000 | 0 | 43 |
| 45 | 0 | ** | ** | ** | ** | 0.000 | 0 | 45 |
| 47 | − | 0 | 0 | −1410 | 1440 | 2.000 | 1 | 47 |
| 49 | + | 0 | 0 | 1470 | 1440 | 2.000 | 1 | 49 |
| 51 | 0 | ** | ** | ** | ** | 0.000 | 0 | 51 |
| 53 | − | 0 | 0 | −1590 | 1620 | 0.000 | 0 | 53 |
| 55 | + | 0 | 0 | 1650 | 1620 | 0.000 | 0 | 55 |

OUTPUT 1= 15 ø SHIFT;  OUTPUT 4= 60 ø SHIFT
OUTPUT 2= 30 ø SHIFT;
OUTPUT 3= 45 ø SHIFT;

| HARMONIC ORDER | PHASE | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | OUTPUT #3 HARM PHASE SHIFT | OUTPUT #3 REFLECTED INPUT CURRENT SHIFT | OUTPUT #4 HARM PHASE SHIFT | OUTPUT #4 REFLECTED INPUT CURRENT SHIFT | VECTORIAL SUM REFLECTED INPUT | NORMALIZED VECTORIAL SUM REFLECTED INPUT | HARMONIC ORDER |
|---|---|---|---|---|---|---|---|---|---|---|---|---|
| 1 | + | −15 | 0 | −30 | 0 | −45 | 0 | −60 | 0 | 4.000 | 1 | 1 |
| 3 | o | ** | ** | ** | ** | ** | ** | ** | ** | 0.000 | 0 | 3 |
| 5 | − | 75 | 90 | 150 | 180 | 225 | 270 | 300 | 360 | 0.000 | 0 | 5 |
| 7 | + | −105 | 90 | 210 | 180 | −315 | 270 | −420 | 360 | 0.000 | 0 | 7 |
| 9 | o | ** | ** | ** | ** | ** | ** | ** | ** | 0.000 | 0 | 9 |
| 11 | − | 165 | 180 | −330 | 360 | 495 | 540 | 660 | 720 | 0.000 | 0 | 11 |
| 13 | + | −195 | 180 | 390 | 360 | −585 | 540 | −780 | 720 | 0.000 | 0 | 13 |
| 15 | o | ** | ** | ** | ** | ** | ** | ** | ** | 0.000 | 0 | 15 |
| 17 | − | 255 | 270 | −510 | 540 | 765 | 810 | 1020 | 1080 | 0.000 | 0 | 17 |
| 19 | + | −285 | 270 | 570 | 540 | −855 | 810 | −1140 | 1080 | 0.000 | 0 | 19 |
| 21 | o | ** | ** | ** | ** | ** | ** | ** | ** | 0.000 | 0 | 21 |
| 23 | − | 345 | 360 | −690 | 720 | 1035 | 1080 | 1380 | 1440 | 4.000 | 1 | 23 |
| 25 | + | −375 | 360 | 750 | 720 | −1125 | 1080 | −1500 | 1440 | 4.000 | 1 | 25 |
| 27 | o | ** | ** | ** | ** | ** | ** | ** | ** | 0.000 | 0 | 27 |
| 29 | − | 435 | 450 | −870 | 900 | 1305 | 1350 | 1740 | 1800 | 0.000 | 0 | 29 |
| 31 | + | −485 | 450 | 930 | 900 | −1395 | 1350 | −1860 | 1800 | 0.000 | 0 | 31 |
| 33 | o | ** | ** | ** | ** | ** | ** | ** | ** | 0.000 | 0 | 33 |
| 35 | − | 525 | 540 | −1050 | 1080 | 1575 | 1620 | 2100 | 2160 | 0.000 | 0 | 35 |
| 37 | + | −555 | 540 | 1110 | 1080 | −1665 | 1620 | −2220 | 2160 | 0.000 | 0 | 37 |
| 39 | o | ** | ** | ** | ** | ** | ** | ** | ** | 0.000 | 0 | 39 |
| 41 | − | 615 | 630 | −1230 | 1260 | 1845 | 1890 | 2460 | 2520 | 0.000 | 0 | 41 |
| 43 | + | −645 | 630 | 1290 | 1260 | −1935 | 1890 | −2580 | 2520 | 0.000 | 0 | 43 |
| 45 | o | ** | ** | ** | ** | ** | ** | ** | ** | 0.000 | 0 | 45 |
| 47 | − | 705 | 720 | −1410 | 1440 | 2115 | 2160 | 2820 | 2880 | 4.000 | 1 | 47 |
| 49 | + | −735 | 720 | 1470 | 1440 | −2205 | 2160 | −2940 | 2880 | 4.000 | 1 | 49 |
| 51 | o | ** | ** | ** | ** | ** | ** | ** | ** | 0.000 | 0 | 51 |
| 53 | − | 795 | 810 | −1590 | 1620 | 2385 | 2430 | 3180 | 3240 | 0.000 | 0 | 53 |
| 55 | + | −825 | 810 | 1650 | 1620 | −2475 | 2430 | −3300 | 3240 | 0.000 | 0 | 55 |

OUTPUT #1= 20 ø SHIFT;
OUTPUT #2= 0 ø SHIFT;
OUTPUT #3= -20 ø SHIFT;

| HARMONIC ORDER | PHASE SEQ | OUTPUT # 1 | | OUTPUT # 2 | | OUTPUT #3 | | VECTORIAL SUM REFLECTED TO INPUT | NORMALIZED VECTORIAL SUM REFLECTED TO INPUT | HARD ORMENR IC |
|---|---|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT | | | |
| 1 | + | -20 | 20 | 0 | 0 | -20 | -20 | 3.000 | 1 | 1 |
| 3 | 0 | ** | ** | ** | ** | ** | ** | 0.000 | 0 | 3 |
| 5 | - | 100 | 120 | 0 | 0 | -100 | -120 | 0.000 | 0 | 5 |
| 7 | + | -140 | -120 | 0 | 0 | 140 | 120 | 0.000 | 0 | 7 |
| 9 | 0 | ** | ** | ** | ** | ** | ** | 0.000 | 0 | 9 |
| 11 | - | 220 | 240 | 0 | 0 | -220 | -240 | 0.000 | 0 | 11 |
| 13 | + | -260 | -240 | 0 | 0 | 260 | 240 | 0.000 | 0 | 13 |
| 15 | 0 | ** | ** | ** | ** | ** | ** | 0.000 | 0 | 15 |
| 17 | - | 340 | 360 | 0 | 0 | -340 | -360 | 3.000 | 1 | 17 |
| 19 | + | -380 | -360 | 0 | 0 | 380 | 360 | 3.000 | 1 | 19 |
| 21 | 0 | ** | ** | ** | ** | ** | ** | 0.000 | 0 | 21 |
| 23 | - | 460 | 480 | 0 | 0 | -460 | -480 | 0.000 | 0 | 23 |
| 25 | + | -500 | -480 | 0 | 0 | 500 | 480 | 0.000 | 0 | 25 |
| 27 | 0 | ** | ** | ** | ** | ** | ** | 0.000 | 0 | 27 |
| 29 | - | 580 | 600 | 0 | 0 | -580 | -600 | 0.000 | 0 | 29 |
| 31 | + | -620 | -600 | 0 | 0 | 620 | 600 | 0.000 | 0 | 31 |
| 33 | 0 | ** | ** | ** | ** | ** | ** | 0.000 | 0 | 33 |
| 35 | - | 700 | 720 | 0 | 0 | -700 | -720 | 3.000 | 1 | 35 |
| 37 | + | -740 | -720 | 0 | 0 | 740 | 720 | 3.000 | 1 | 37 |
| 39 | 0 | ** | ** | ** | ** | ** | ** | 0.000 | 0 | 39 |
| 41 | - | 820 | 840 | 0 | 0 | -820 | -840 | 0.000 | 0 | 41 |
| 43 | + | -860 | -840 | 0 | 0 | 860 | 840 | 0.000 | 0 | 43 |
| 45 | 0 | ** | ** | ** | ** | ** | ** | 0.000 | 0 | 45 |
| 47 | - | 940 | 960 | 0 | 0 | -940 | -960 | 0.000 | 0 | 47 |
| 49 | + | -980 | -960 | 0 | 0 | 980 | 960 | 0.000 | 0 | 49 |
| 51 | 0 | ** | ** | ** | ** | ** | ** | 0.000 | 0 | 51 |
| 53 | - | 1060 | 1080 | 0 | 0 | -1060 | -1080 | 3.000 | 1 | 53 |
| 55 | + | -1100 | -1080 | 0 | 0 | 1100 | 1080 | 3.000 | 1 | 55 |

FIG. 11a

OUTPUT #1= 20 ø SHIFT;
OUTPUT #2= 40 ø SHIFT;
OUTPUT #3= 60 ø SHIFT;

| HARMONIC ORDER | PHASE SEQ | OUTPUT # 1 | | OUTPUT # 2 | | OUTPUT #3 | | VECTORIAL SUM REFLECTED TO INPUT | NORMALIZED VECTORIAL SUM REFLECTED TO INPUT | HARMONIC ORDER |
|---|---|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT | | | |
| 1 | + | −20 | 0 | 40 | 0 | 60 | 0 | 3.000 | 1 | 1 |
| 3 | 0 | ** | ** | ** | ** | ** | ** | 0.000 | 0 | 3 |
| 5 | − | 100 | 120 | 200 | 240 | 300 | 360 | 0.000 | 0 | 5 |
| 7 | + | −140 | 120 | 280 | 240 | −420 | 360 | 0.000 | 0 | 7 |
| 9 | 0 | ** | ** | ** | ** | ** | ** | 0.000 | 0 | 9 |
| 11 | − | 220 | 240 | −440 | 480 | 660 | 720 | 0.000 | 0 | 11 |
| 13 | + | −260 | 240 | 520 | 480 | −780 | 720 | 0.000 | 0 | 13 |
| 15 | 0 | ** | ** | ** | ** | ** | ** | 0.000 | 0 | 15 |
| 17 | − | 340 | 360 | −680 | 720 | 1020 | 1080 | 3.000 | 1 | 17 |
| 19 | + | −380 | 360 | 760 | 720 | −1140 | 1080 | 3.000 | 1 | 19 |
| 21 | 0 | ** | ** | ** | ** | ** | ** | 0.000 | 0 | 21 |
| 23 | − | 460 | 480 | −920 | 960 | 1380 | 1440 | 0.000 | 0 | 23 |
| 25 | + | −500 | 480 | 1000 | 960 | −1500 | 1440 | 0.000 | 0 | 25 |
| 27 | 0 | ** | ** | ** | ** | ** | ** | 0.000 | 0 | 27 |
| 29 | − | 580 | 600 | −1160 | 1200 | 1740 | 1800 | 0.000 | 0 | 29 |
| 31 | + | −620 | 600 | 1240 | 1200 | −1860 | 1800 | 0.000 | 0 | 31 |
| 33 | 0 | ** | ** | ** | ** | ** | ** | 0.000 | 0 | 33 |
| 35 | − | 700 | 720 | −1400 | 1440 | 2100 | 2160 | 3.000 | 1 | 35 |
| 37 | + | −740 | 720 | 1480 | 1440 | −2220 | 2160 | 3.000 | 1 | 37 |
| 39 | 0 | ** | ** | ** | ** | ** | ** | 0.000 | 0 | 39 |
| 41 | − | 820 | 840 | −1640 | 1680 | 2460 | 2520 | 0.000 | 0 | 41 |
| 43 | + | −860 | 840 | 1720 | 1680 | −2580 | 2520 | 0.000 | 0 | 43 |
| 45 | 0 | ** | ** | ** | ** | ** | ** | 0.000 | 0 | 45 |
| 47 | − | 940 | 960 | −1880 | 1920 | 2820 | 2880 | 0.000 | 0 | 47 |
| 49 | + | −980 | 960 | 1960 | 1920 | −2940 | 2880 | 0.000 | 0 | 49 |
| 51 | 0 | ** | ** | ** | ** | ** | ** | 0.000 | 0 | 51 |
| 53 | − | 1060 | 1080 | −2120 | 2160 | 3180 | 3240 | 3.000 | 1 | 53 |
| 55 | + | −1100 | 1080 | 2200 | 2160 | −3300 | 3240 | 3.000 | 1 | 55 |

FIG. 11b

OUTPUT #1 =     0 ∅ SHIFT;
OUTPUT #2 =    18 ∅ SHIFT;

| HARMONIC ORDER | PHASE SEQ | OUTPUT # 1 | | OUTPUT # 2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1  | + | 0  | 0  | 18   | 18  | 2.000 | 1.000 | 1  |
| 3  | 0 | ** | ** | **   | **  | 0.000 | 0.000 | 3  |
| 5  | − | 0  | 0  | 90   | 108 | 1.176 | 0.588 | 5  |
| 7  | + | 0  | 0  | 126  | 108 | 1.176 | 0.588 | 7  |
| 9  | 0 | ** | ** | **   | **  | 0.000 | 0.000 | 9  |
| 11 | − | 0  | 0  | −198 | 216 | 0.618 | 0.309 | 11 |
| 13 | + | 0  | 0  | 234  | 216 | 0.618 | 0.309 | 13 |
| 15 | 0 | ** | ** | **   | **  | 0.000 | 0.000 | 15 |
| 17 | − | 0  | 0  | −306 | 324 | 1.902 | 0.951 | 17 |
| 19 | + | 0  | 0  | 342  | 324 | 1.902 | 0.951 | 19 |
| 21 | 0 | ** | ** | **   | **  | 0.000 | 0.000 | 21 |
| 23 | − | 0  | 0  | −414 | 432 | 1.618 | 0.809 | 23 |
| 25 | + | 0  | 0  | 450  | 432 | 1.618 | 0.809 | 25 |
| 27 | 0 | ** | ** | **   | **  | 0.000 | 0.000 | 27 |
| 29 | − | 0  | 0  | −522 | 540 | 0.000 | 0.000 | 29 |
| 31 | + | 0  | 0  | 558  | 540 | 0.000 | 0.000 | 31 |
| 33 | 0 | ** | ** | **   | **  | 0.000 | 0.000 | 33 |
| 35 | − | 0  | 0  | −630 | 648 | 1.618 | 0.809 | 35 |
| 37 | + | 0  | 0  | 666  | 648 | 1.618 | 0.809 | 37 |
| 39 | 0 | ** | ** | **   | **  | 0.000 | 0.000 | 39 |
| 41 | − | 0  | 0  | −738 | 756 | 1.902 | 0.951 | 41 |
| 43 | + | 0  | 0  | 774  | 756 | 1.902 | 0.951 | 43 |
| 45 | 0 | ** | ** | **   | **  | 0.000 | 0.000 | 45 |
| 47 | − | 0  | 0  | −846 | 864 | 0.618 | 0.309 | 47 |
| 49 | + | 0  | 0  | 882  | 864 | 0.618 | 0.309 | 49 |
| 51 | 0 | ** | ** | **   | **  | 0.000 | 0.000 | 51 |
| 53 | − | 0  | 0  | −954 | 972 | 1.176 | 0.588 | 53 |
| 55 | + | 0  | 0  | 990  | 972 | 1.176 | 0.588 | 55 |

FIG. 12

OUTPUT #1= -7.5 ∅ SHIFT;
OUTPUT #2= -15 ∅ SHIFT;

| HARMONIC ORDER | PHASE SEQ | OUTPUT # 1 | | OUTPUT # 2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1  | + | -7.5   | -7.5  | -15  | -15  | 2.000 | 1.000 | 1  |
| 3  | 0 | **     | **    | **   | **   | 0.000 | 0.000 | 3  |
| 5  | - | -37.5  | -45   | -75  | -90  | 1.848 | 0.924 | 5  |
| 7  | + | 52.5   | -45   | 105  | -90  | 1.848 | 0.924 | 7  |
| 9  | 0 | **     | **    | **   | **   | 0.000 | 0.000 | 9  |
| 11 | - | -82.5  | -90   | -165 | -180 | 1.414 | 0.707 | 11 |
| 13 | + | 97.5   | -90   | 195  | -180 | 1.414 | 0.707 | 13 |
| 15 | 0 | **     | **    | **   | **   | 0.000 | 0.000 | 15 |
| 17 | - | -127.5 | -135  | -255 | -270 | 0.765 | 0.383 | 17 |
| 19 | + | 142.5  | -135  | 285  | -270 | 0.765 | 0.383 | 19 |
| 21 | 0 | **     | **    | **   | **   | 0.000 | 0.000 | 21 |
| 23 | - | -172.5 | -180  | -345 | -360 | 0.000 | 0.000 | 23 |
| 25 | + | 187.5  | -180  | 375  | -360 | 0.000 | 0.000 | 25 |
| 27 | 0 | **     | **    | **   | **   | 0.000 | 0.000 | 27 |
| 29 | - | -217.5 | -225  | -435 | -450 | 0.765 | 0.383 | 29 |
| 31 | + | 232.5  | -225  | 465  | -450 | 0.765 | 0.383 | 31 |
| 33 | 0 | **     | **    | **   | **   | 0.000 | 0.000 | 33 |
| 35 | - | -262.5 | -270  | -525 | -540 | 1.414 | 0.707 | 35 |
| 37 | + | 277.5  | -270  | 555  | -540 | 1.414 | 0.707 | 37 |
| 39 | 0 | **     | **    | **   | **   | 0.000 | 0.000 | 39 |
| 41 | - | -307.5 | -315  | -615 | -630 | 1.848 | 0.924 | 41 |
| 43 | + | 322.5  | -315  | 645  | -630 | 1.848 | 0.924 | 43 |
| 45 | 0 | **     | **    | **   | **   | 0.000 | 0.000 | 45 |
| 47 | - | -352.5 | -360  | -705 | -720 | 2.000 | 1.000 | 47 |
| 49 | + | 367.5  | -360  | 735  | -720 | 2.000 | 1.000 | 49 |
| 51 | 0 | **     | **    | **   | **   | 0.000 | 0.000 | 51 |
| 53 | - | -397.5 | -405  | -795 | -810 | 1.848 | 0.924 | 53 |
| 55 | + | 412.5  | -405  | 825  | -810 | 1.848 | 0.924 | 55 |

FIG. 13

OUTPUT #1 =   12 ø SHIFT;    OUTPUT #4    48 ø SHIFT
OUTPUT #2 =   24 ø SHIFT;    OUTPUT #5    60 ø SHIFT
OUTPUT #3 =   36 ø SHIFT;

| HARMONIC ORDER | PHASE SEQ | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | OUTPUT #3 HARM PHASE SHIFT | OUTPUT #3 REFLECTED INPUT CURRENT SHIFT |
|---|---|---|---|---|---|---|---|
| 1  | + | −12   | 0   | −24   | 0    | −36   | 0    |
| 3  | 0 | **    | **  | **    | **   | **    | **   |
| 5  | − | 60    | 72  | 120   | 144  | 180   | 216  |
| 7  | + | −84   | 72  | −168  | 144  | −252  | 216  |
| 9  | 0 | **    | **  | **    | **   | **    | **   |
| 11 | − | 132   | 144 | 264   | 288  | 396   | 432  |
| 13 | + | −156  | 144 | −312  | 288  | −468  | 432  |
| 15 | 0 | **    | **  | **    | **   | **    | **   |
| 17 | − | 204   | 216 | 408   | 432  | 612   | 648  |
| 19 | + | −228  | 216 | −458  | 432  | −684  | 648  |
| 21 | 0 | **    | **  | **    | **   | **    | **   |
| 23 | − | 276   | 288 | 552   | 576  | 828   | 864  |
| 25 | + | −300  | 288 | −600  | 576  | −900  | 864  |
| 27 | 0 | **    | **  | **    | **   | **    | **   |
| 29 | − | 348   | 360 | 696   | 720  | 1044  | 1080 |
| 31 | + | −372  | 360 | −744  | 720  | −1116 | 1080 |
| 33 | 0 | **    | **  | **    | **   | **    | **   |
| 35 | − | 420   | 432 | 840   | 864  | 1260  | 1296 |
| 37 | + | −444  | 432 | −888  | 864  | −1332 | 1296 |
| 39 | 0 | **    | **  | **    | **   | **    | **   |
| 41 | − | 492   | 504 | 984   | 1008 | 1476  | 1512 |
| 43 | + | −516  | 504 | −1032 | 1008 | −1548 | 1512 |
| 45 | 0 | **    | **  | **    | **   | **    | **   |
| 47 | − | 564   | 576 | 1128  | 1152 | 1692  | 1728 |
| 49 | + | −588  | 576 | −1176 | 1152 | −1764 | 1728 |
| 51 | 0 | **    | **  | **    | **   | **    | **   |
| 53 | − | 636   | 648 | 1272  | 1296 | 1906  | 1944 |
| 55 | + | −660  | 648 | −1320 | 1296 | −1980 | 1944 |

FIG. 14a

| OUTPUT #4 | | OUTPUT #5 | | VECTORIAL SUM REFLECTED TO INPUT | NORMALIZED VECTORIAL SUM REFLECTED TO INPUT | HARMONIC ORDER |
|---|---|---|---|---|---|---|
| HARM PHASE SHIFT | REFLECTED INPUT CURRENT SHIFT | HARM PHASE SHIFT | REFLECTED INPUT CURRENT SHIFT | | | |
| −48 | 0 | −60 | 0 | 5.000 | 1 | 1 |
| ** | ** | ** | ** | 0.000 | 0 | 3 |
| 240 | 288 | 300 | 360 | 0.000 | 0 | 5 |
| −336 | 288 | −420 | 360 | 0.000 | 0 | 7 |
| ** | ** | ** | ** | 0.000 | 0 | 9 |
| 528 | 576 | 660 | 720 | 0.000 | 0 | 11 |
| −624 | 576 | −780 | 720 | 0.000 | 0 | 13 |
| ** | ** | ** | ** | 0.000 | 0 | 15 |
| 816 | 864 | 1020 | 1080 | 0.000 | 0 | 17 |
| −912 | 864 | −1140 | 1080 | 0.000 | 0 | 19 |
| ** | ** | ** | ** | 0.000 | 0 | 21 |
| 1104 | 1152 | 1380 | 1440 | 0.000 | 0 | 23 |
| −1200 | 1152 | −1500 | 1440 | 0.000 | 0 | 25 |
| ** | ** | ** | ** | 0.000 | 0 | 27 |
| 1392 | 1440 | 1740 | 1800 | 5.000 | 1 | 29 |
| −1488 | 1440 | −1860 | 1800 | 5.000 | 1 | 31 |
| ** | ** | ** | ** | 0.000 | 0 | 33 |
| 1680 | 1728 | 2100 | 2160 | 0.000 | 0 | 35 |
| −1776 | 1728 | −2220 | 2160 | 0.000 | 0 | 37 |
| ** | ** | ** | ** | 0.000 | 0 | 39 |
| 1968 | 2016 | 2460 | 2520 | 0.000 | 0 | 41 |
| −2064 | 2016 | −2580 | 2520 | 0.000 | 0 | 43 |
| ** | ** | ** | ** | 0.000 | 0 | 45 |
| 2258 | 2304 | 2820 | 2880 | 0.000 | 0 | 47 |
| −2352 | 2304 | −2940 | 2880 | 0.000 | 0 | 49 |
| ** | ** | ** | ** | 0.000 | 0 | 51 |
| 2544 | 2592 | 3180 | 3240 | 0.000 | 0 | 53 |
| −2640 | 2592 | −3300 | 3240 | 0.000 | 0 | 55 |

FIG. 14b

OUTPUT #1= 10 ø SHIFT;          OUTPUT #4  40 ø SHIFT
OUTPUT #2= 20 ø SHIFT;          OUTPUT #5  50 ø SHIFT
OUTPUT #3= 30 ø SHIFT;          OUTPUT #6  60 ø SHIFT

| HARMONIC ORDER | PHASE SEQ | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | OUTPUT #3 HARM PHASE SHIFT | OUTPUT #3 REFLECTED INPUT CURRENT SHIFT | OUTPUT #4 HARM PHASE SHIFT | OUTPUT #4 REFLECTED INPUT CURRENT SHIFT |
|---|---|---|---|---|---|---|---|---|---|
| 1 | + | −10 | 0 | −20 | 0 | −30 | 0 | −40 | 0 |
| 3 | 0 | ** | ** | ** | ** | ** | ** | ** | ** |
| 5 | − | 50 | 60 | 100 | 120 | 150 | 180 | 200 | 240 |
| 7 | + | −70 | 60 | −140 | 120 | −210 | 180 | −280 | 240 |
| 9 | 0 | ** | ** | ** | ** | ** | ** | ** | ** |
| 11 | − | 110 | 120 | 220 | 240 | 330 | 360 | 440 | 480 |
| 13 | + | −130 | 120 | −260 | 240 | −390 | 360 | −520 | 480 |
| 15 | 0 | ** | ** | ** | ** | ** | ** | ** | ** |
| 17 | − | 170 | 180 | 340 | 360 | 510 | 540 | 680 | 720 |
| 19 | + | −190 | 180 | −380 | 360 | −570 | 540 | −760 | 720 |
| 21 | 0 | ** | ** | ** | ** | ** | ** | ** | ** |
| 23 | − | 230 | 240 | 460 | 480 | 690 | 720 | 920 | 960 |
| 25 | + | −250 | 240 | −500 | 480 | −750 | 720 | −1000 | 960 |
| 27 | 0 | ** | ** | ** | ** | ** | ** | ** | ** |
| 29 | − | 290 | 300 | 580 | 600 | 870 | 900 | 1160 | 1200 |
| 31 | + | −310 | 300 | −620 | 600 | −930 | 900 | −1240 | 1200 |
| 33 | 0 | ** | ** | ** | ** | ** | ** | ** | ** |
| 35 | − | 350 | 360 | 700 | 720 | 1050 | 1080 | 1400 | 1440 |
| 37 | + | −370 | 360 | −740 | 720 | −1110 | 1080 | −1480 | 1440 |
| 39 | 0 | ** | ** | ** | ** | ** | ** | ** | ** |
| 41 | − | 410 | 420 | 820 | 840 | 1230 | 1260 | 1640 | 1680 |
| 43 | + | −430 | 420 | −860 | 840 | −1290 | 1260 | −1720 | 1680 |
| 45 | 0 | ** | ** | ** | ** | ** | ** | ** | ** |
| 47 | − | 470 | 480 | 940 | 960 | 1410 | 1440 | 1880 | 1920 |
| 49 | + | −490 | 480 | −980 | 960 | −1470 | 1440 | −1960 | 1920 |
| 51 | 0 | ** | ** | ** | ** | ** | ** | ** | ** |
| 53 | − | 530 | 540 | 1060 | 1080 | 1590 | 1620 | 2120 | 2160 |
| 55 | + | −550 | 540 | −1100 | 1080 | −1650 | 1620 | −2200 | 2160 |

FIG. 15a

| OUTPUT #5 | | OUTPUT #6 | | VECTORIAL SUM REFLECTED TO INPUT | NORMALIZED VECTORIAL SUM REFLECTED TO INPUT | HARMONIC ORDER |
|---|---|---|---|---|---|---|
| HARM PHASE SHIFT | REFLECTED INPUT CURRENT SHIFT | HARM PHASE SHIFT | REFLECTED INPUT CURRENT SHIFT | | | |
| −50 | 0 | −60 | 0 | 6.000 | 1 | 1 |
| ** | ** | ** | ** | 0.000 | 0 | 3 |
| 250 | 300 | 300 | 360 | 0.000 | 0 | 5 |
| −350 | 300 | −420 | 360 | 0.000 | 0 | 7 |
| ** | ** | ** | ** | 0.000 | 0 | 9 |
| 550 | 600 | 660 | 720 | 0.000 | 0 | 11 |
| −650 | 600 | −780 | 720 | 0.000 | 0 | 13 |
| ** | ** | ** | ** | 0.000 | 0 | 15 |
| 850 | 900 | 1020 | 1080 | 0.000 | 0 | 17 |
| −950 | 900 | −1140 | 1080 | 0.000 | 0 | 19 |
| ** | ** | ** | ** | 0.000 | 0 | 21 |
| 1150 | 1200 | 1380 | 1440 | 0.000 | 0 | 23 |
| −1250 | 1200 | −1500 | 1440 | 0.000 | 0 | 25 |
| ** | ** | ** | ** | 0.000 | 0 | 27 |
| 1450 | 1500 | 1740 | 1800 | 0.000 | 0 | 29 |
| −1550 | 1500 | −1860 | 1800 | 0.000 | 0 | 31 |
| ** | ** | ** | ** | 0.000 | 0 | 33 |
| 1750 | 1800 | 2100 | 2160 | 6.000 | 1 | 35 |
| −1850 | 1800 | −2220 | 2160 | 6.000 | 1 | 37 |
| ** | ** | ** | ** | 0.000 | 0 | 39 |
| 2050 | 2100 | 2460 | 2520 | 0.000 | 0 | 41 |
| −2150 | 2100 | −2580 | 2520 | 0.000 | 0 | 43 |
| ** | ** | ** | ** | 0.000 | 0 | 45 |
| 2350 | 2400 | 2820 | 2880 | 0.000 | 0 | 47 |
| −2450 | 2400 | −2940 | 2880 | 0.000 | 0 | 49 |
| ** | ** | ** | ** | 0.000 | 0 | 51 |
| 2650 | 2700 | 3180 | 3240 | 0.000 | 0 | 53 |
| −2750 | 2700 | −3300 | 3240 | 0.000 | 0 | 55 |

FIG. 15b

| HARMONIC | NORMALIZED OUTPUT USING A 2 WYE SECONDARY XFMR DA=30 DEG | NORMALIZED OUTPUT USING A 2 WYE SECONDARY XFMR DA=18 DEG | NORMALIZED OUTPUT USING A 3 WYE SECONDARY XFMR DA=20 DEG | NORMALIZED OUTPUT USING A 4 WYE SECONDARY XFMR DA=15 DEG | NORMALIZED OUTPUT USING A 5 WYE SECONDARY XFMR DA=12 DEG | NORMALIZED OUTPUT USING A 6 WYE SECONDARY XFMR DA=10 DEG | HARMONIC |
|---|---|---|---|---|---|---|---|
| 1 | 1.000 | 1.000 | 1.000 | 1.000 | 1.000 | 1.000 | 1 |
| 3 | 0.000 | 0.000 | 0.000 | 0.000 | 0.000 | 0.000 | 3 |
| 5 | 0.000 | 0.588 | 0.000 | 0.000 | 0.000 | 0.000 | 5 |
| 7 | 0.000 | 0.588 | 0.000 | 0.000 | 0.000 | 0.000 | 7 |
| 9 | 0.000 | 0.000 | 0.000 | 0.000 | 0.000 | 0.000 | 9 |
| 11 | 1.000 | 0.309 | 0.000 | 0.000 | 0.000 | 0.000 | 11 |
| 13 | 1.000 | 0.309 | 0.000 | 0.000 | 0.000 | 0.000 | 13 |
| 15 | 0.000 | 0.000 | 0.000 | 0.000 | 0.000 | 0.000 | 15 |
| 17 | 0.000 | 0.951 | 1.000 | 0.000 | 0.000 | 0.000 | 17 |
| 19 | 0.000 | 0.951 | 1.000 | 0.000 | 0.000 | 0.000 | 19 |
| 21 | 0.000 | 0.000 | 0.000 | 0.000 | 0.000 | 0.000 | 21 |
| 23 | 1.000 | 0.809 | 0.000 | 1.000 | 0.000 | 0.000 | 23 |
| 25 | 1.000 | 0.809 | 0.000 | 1.000 | 0.000 | 0.000 | 25 |
| 27 | 0.000 | 0.000 | 0.000 | 0.000 | 0.000 | 0.000 | 27 |
| 29 | 0.000 | 0.000 | 0.000 | 0.000 | 1.000 | 0.000 | 29 |
| 31 | 0.000 | 0.000 | 0.000 | 0.000 | 1.000 | 0.000 | 31 |
| 33 | 0.000 | 0.000 | 0.000 | 0.000 | 0.000 | 0.000 | 33 |
| 35 | 1.000 | 0.809 | 1.000 | 0.000 | 0.000 | 1.000 | 35 |
| 37 | 1.000 | 0.809 | 1.000 | 0.000 | 0.000 | 1.000 | 37 |
| 39 | 0.000 | 0.000 | 0.000 | 0.000 | 0.000 | 0.000 | 39 |
| 41 | 0.000 | 0.951 | 0.000 | 0.000 | 0.000 | 0.000 | 41 |
| 43 | 0.000 | 0.951 | 0.000 | 0.000 | 0.000 | 0.000 | 43 |
| 45 | 0.000 | 0.000 | 0.000 | 0.000 | 0.000 | 0.000 | 45 |
| 47 | 1.000 | 0.309 | 0.000 | 1.000 | 0.000 | 0.000 | 47 |
| 49 | 1.000 | 0.309 | 0.000 | 1.000 | 0.000 | 0.000 | 49 |
| 51 | 0.000 | 0.000 | 0.000 | 0.000 | 0.000 | 0.000 | 51 |
| 53 | 0.000 | 0.588 | 1.000 | 0.000 | 0.000 | 0.000 | 53 |
| 55 | 0.000 | 0.588 | 1.000 | 0.000 | 0.000 | 0.000 | 55 |

FIG. 16

HARMONIC CANCELLATION SYSTEM

This application is a continuation-in-part of U.S. patent application Ser. No. 196,813, filed Feb. 14, 1994, which is a continuation of U.S. patent application Ser. No. 07/992,061, filed Dec. 16, 1992, now abandoned, which is a continuation-in-part of U.S. patent application Ser. No. 07/792,893, filed Nov. 15, 1991, now U.S. Pat. No. 5,206,539.

BACKGROUND OF THE INVENTION

1. Field of the Invention

The present invention relates to a polyphase voltage transformer which magnetically cancels harmonic currents caused by non-linear loads, and thereby reduces the harmonic current percentage present in the input line power distribution network.

2. Description of Related Art

Harmonic currents present in a power distribution network can present significant problems, including power losses, overheating, resonances and overvoltages, operational instability, and radio frequency disturbances. Any electronic circuit which presents a non-linear load to the power source will inherently generate harmonic currents. In many applications, for example at data processing and telecommunication sites, power distribution feeders may carry up to 80% harmonic currents. Power thyristors, rectifiers, and "switch mode" power supplies commonly used in data processing and telecommunications equipment are inherently non-linear and are a major cause of power supply degradation due to generation of harmonics.

Numerous systems have been proposed for on-site harmonic current reduction, including proposals involving use of multiple transformers or multi-phase transformers with delta coupled secondary windings. An example of the former, involving use of two single phase transformers having primary and secondary windings coupled in quadrature, together with "filtering" transformers between each of the taps, the filter transformers having a low impedance to desirable "phase equal" currents, is disclosed in U.S. Pat. No. 3,671,901. An example of the latter is disclosed in U.S. Pat. No. 4,779,189, which describes a system in which harmonics are essentially reduced by greatly increasing the number of phases at the output.

All transformer systems involve some type of phase shifting in the secondary windings (a concept which dates back to the earliest "zig-zag" transformers), whether intentional or unintentional, but attempts to reduce harmonics have generally focused on using auxiliary circuitry to reduce the harmonics so that none are induced in the core. One prior attempt at on-site harmonic current reduction which used phase control is disclosed in U.S. Pat. Nos. 4,513,240 and 4,513,243. These patents disclose the addition of an auxiliary wye-connected secondary winding to the principal secondary windings (and in addition the use of dynamic stabilizers) to provide reactive power compensation by causing all three phases to be present in each combination of principal secondary windings and auxiliary secondary windings, the combination of phase rotation and positive leakage reactants in the system resulting in the selective cancellation of resonant currents produced in the dynamic stabilizers so that the harmonic currents are not present in the principal secondary windings, and therefore are not induced in the transformer core. While apparently effective, this type of system is best suited for application to heavy machinery, such as in locomotives, because of its size and complexity.

In general, prior solutions to the harmonics problem have proved to be impractical for non-industrial applications because they are either overly complex and therefore costly, excessively bulky, or inefficient. In the case of a transformer with delta connected secondary windings, for example, a 30° phase shift can be used to delete some lower order harmonics, but this configuration can only be used to power very specific types of three phase loads. Since the delta connected secondary does not have a natural neutral, single phase loads and three-phase delta loads present problems. Most of the other known systems for reducing harmonics have similarly limited application.

In contrast, the present invention provides a harmonic suppression transformer in which all significant harmonic currents may be completely cancelled. This is accomplished using multiple wye-connected three-phase secondary outputs, and by phase shifting the outputs in such a way that the harmonics magnetically cancel each other in the transformer core and/or primary coils. As a result, a variety of load types may be accommodated.

While the technique of providing multiple three-phase wye connected outputs has previously been proposed, the technique has heretofore not been applied in a way which would suppress harmonics, Instead, the technique has been used for providing multiple outputs phase shifted in respect to each other by 180°, as disclosed in U.S. Pat. No. 2,470,598. The 180° phase shift arrangement does not have the effect of cancelling harmonics.

Because it has previously been thought necessary to provide delta connected or complex auxiliary secondary windings for harmonic suppression purposes, with or without the addition of additional tuning or filtering means such as the filtering transformers disclosed in U.S. Pat. No. 3,671,901, cited above, or to provide stabilizers in connection with the connected secondaries as in U.S. Pat. No. 3,671,901, also cited above, those skilled in the art have heretofore been unable to take advantage of the simplicity and compatibility advantages of a wye connection in applications requiring harmonic current suppression without complex stabilizer and/or auxiliary winding systems.

SUMMARY OF THE INVENTION

In view of the heretofore unresolved need for a system which provides complete harmonic current suppression and which is nevertheless applicable to a wide variety of load types, it is an objective of the invention to provide a system capable of filtering harmonic currents by completely cancelling the harmonic currents, for any desired number of orders and for any fundamental frequency, while nevertheless using simple wye-connected outputs and a standard delta ampere (KVA) or apparent power conservation device.

It is a further objective of the invention to provide a magnetic cancellation device for harmonic current suppression which can be packaged for use in a wide variety of applications, including fixed and/or mobile power distribution units, fixed and/or mobile harmonic cancellation units, as a load linearizer to isolate non-linear loads from other equipment, as a power factor correction device, and as a kilovolt-ampere (KVA) or apparent power conservation device.

It is yet another objective of the invention to provide a magnetic cancellation device capable of being connected to any or all of the following power sources:
  utility power
  a power conditioner such as a line regulator or a motor/alternator
  an uninterruptable power source (UPS)
  any other power source
and also to any or all of the following loads:
  passive loads
  linear loads
  non-linear loads
  loads using active devices like semi-conductors.

In other words, it is an objective of the invention to provide a harmonic cancelling power system which can be packaged in a convenient unit and yet which can be applied to any type of power input without affecting the power input regardless of the load. The power system can be used with a variety of protective devices, disconnect devices, and reactive and tuned series or shunt filters at either the input or output side of the harmonic cancellation transformer, and can be connected through a distribution panel or the like to multiple active and/or passive, linear and/or nonlinear loads.

These objectives of the invention are achieved by providing, according to a preferred embodiment of the invention, a power system which includes a magnetic cancellation device or transformer having multiple three-phase secondary output windings connected such that the winding for each of the phases includes an in-phase coil connected between a common neutral and vector coils for each of the other two phases, the output windings thereby being phase shifted relative to each other by an amount which causes harmonic currents generated on the secondary winding side of the transformer by harmonic currents of selected orders to magnetically cancel in the transformer core without the need for additional harmonic cancelling electrical devices or more complex multiple output winding arrangements.

The magnitudes of the secondary output differential phase shifts required for cancellation are determined, according to the principles of the invention, by the distribution of the load harmonic currents, and the number of output windings. For example, for a three-phase two output transformer, constructed in accordance with a first embodiment of the invention, a relative secondary phase shift of 30° achieves complete cancellation of the fifth, seventh, seventeenth, and nineteenth harmonics. The eleventh and thirteenth harmonics are completely cancelled by a four output transformer having a relative phase shift of 15°, while triplens may be cancelled in either embodiment by a delta connected three wire primary. Additional embodiments of the invention can achieve total or partial cancellation of virtually any desired combination of harmonics, depending on the number of output windings and their relative phase shifts.

The preferred configuration has the advantage of requiring only a single core, thereby reducing the size and cost of the system (although multiple cores may be used with the single harmonic cancelling core if desired). Further, because the invention uses multiple wye secondaries, the system has the advantage that both single phase and of three-phase loads of various types can be powered safely.

It will be appreciated that the preferred embodiment of a transformer as shown in FIGS. 1-6, described in detail below and also in parent application Ser. No. 07/792,893, filed Nov. 15, 1991, now U.S. Pat. No. 5,206,539 is especially applicable for use as a power distribution unit for supplying computer grade power to data processing equipment, and also for main frame applications. This type of transformer provides complete isolation, distribution, control, and monitoring of AC power. The power distribution unit can include everything required to correctly interface the uninterruptable power source to its intended load.

BRIEF DESCRIPTION OF THE DRAWINGS

FIG. 7 is a table of relative magnitudes and phases for the vector diagram of FIG. 6.

FIG. 8(a) is a table illustrating the manner in which the preferred dual output transformer of FIG. 1 causes harmonic currents to be cancelled.

FIG. 8(b) is a table illustrating the effect of varying the primary to secondary phase angle in the transformer of FIG. 8(a).

FIG. 10 is a table illustrating the manner in which selected harmonic currents are cancelled by the transformer of FIG. 2.

FIG. 11(a) is a table illustrating the manner in which selected harmonic currents are cancelled by a transformer having three secondary windings relatively phase shifted by 20°.

FIG. 11(b) is a table illustrating the effect of varying the primary to secondary phase angle in the transformer of FIG. 11(a).

FIG. 12 is a table illustrating the manner in which selected harmonic currents are partially rather than completely cancelled by a transformer having two secondary windings relatively phase shifted by 18°.

FIG. 13 is a table illustrating the manner in which selected harmonic currents are partially cancelled by a transformer having two secondary windings relatively phase shifted by 75°.

FIGS. 14(a) and 14(b) are tables illustrating the manner in which selected harmonic currents are completely cancelled by a five output transformer with a relative secondary phase shift of 12°.

FIGS. 15(a) and 15(b) are tables illustrating the manner in which selected harmonic currents are completely cancelled by a six output transformer with a relative secondary phase shift of 10°.

FIG. 16 is a table summarizing the harmonic orders completely or partially cancelled by the respective exemplary two through six output transformers shown in FIGS. 8(a), 12, 11(a), 10, 14 and 15.

DETAILED DESCRIPTION OF THE PREFERRED EMBODIMENTS

Figure 1:
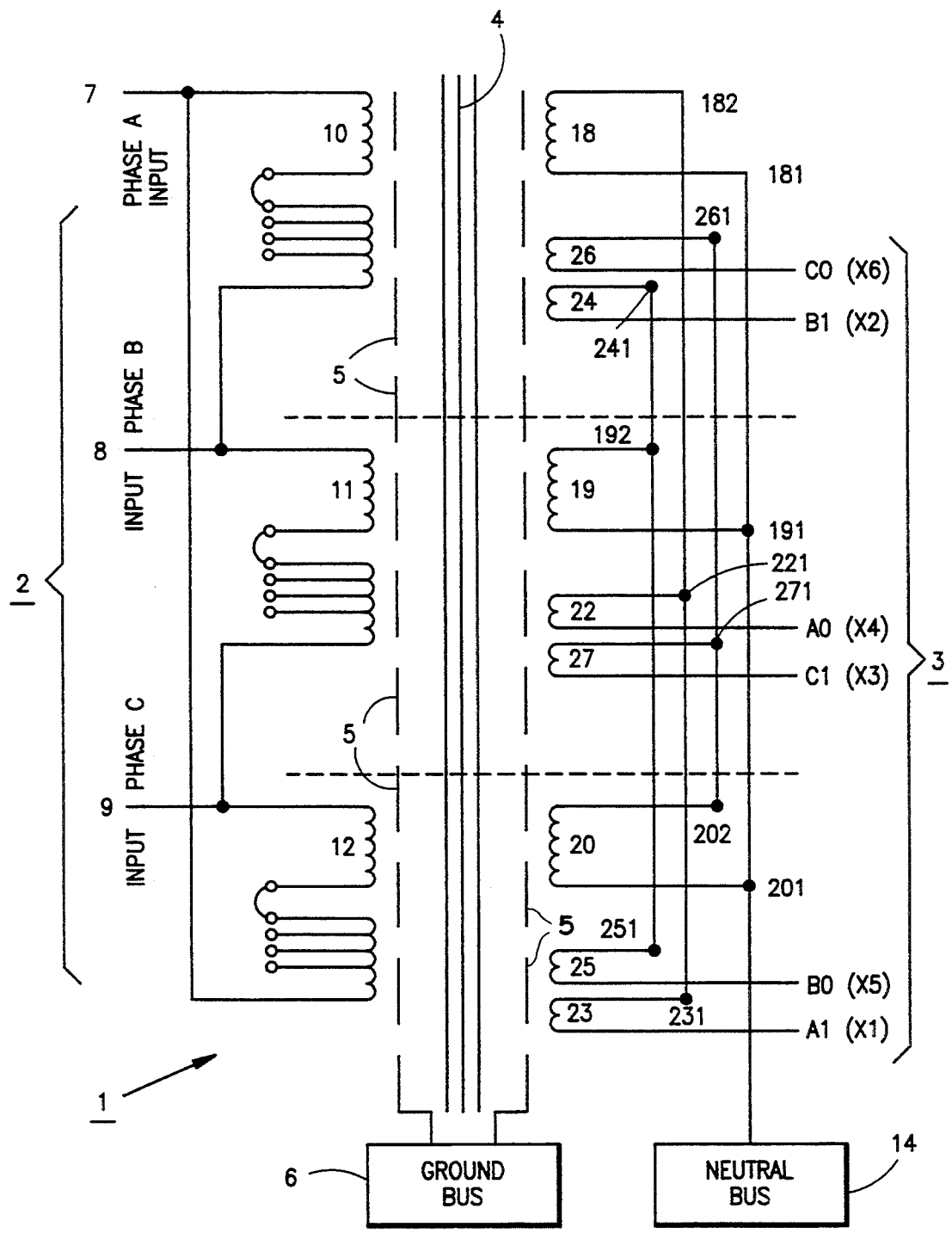
FIG. 1 is a schematic circuit diagram of a transformer having two wye-connected secondary output windings according to a preferred embodiment of the invention.

As shown in FIG. 1, a magnetic cancellation device or transformer 1 constructed according to a first preferred embodiment of the invention includes a three-phase primary input winding 2 and a three-phase secondary winding 3 made up of two three-phase secondary output windings. Transformer 1 also includes a core 4 and, optionally, shields 5 between the primary and secondary windings and the core, and connected to a common ground bus 6. The input winding, as is conventional, includes three input terminals 7-9 and three coils 10-12 preferably connected in delta configuration for each of the three phases A-C of the input, although the invention is not intended to be limited to any particular input winding configuration. The delta wound input has the advantage that "triplens", i.e, odd harmonic orders which are integer multiples of three, are cancelled by the delta input.

It will be appreciated that FIG. 1 is schematic in nature and does not show the actual physical construction of the core and windings. In practice, the windings are wound around the core and may overlap each other, while the core may have a wide variety of configurations. For example, the core may be a single core, or it may be formed from multiple cores, although it is an advantage of the invention that a single core may be used if desired. In addition, the core may be made of steel, although other magnetic materials may also be used as core materials. The invention is directed not to the core structure per se but to the connections between the secondary windings, and implementation of the invention will be readily understood by those skilled in the art based on the following description of the secondary winding connections.

The secondary winding of the transformer includes two separate output windings each having a phase A terminal, a phase B terminal, and a phase C terminal. These terminals are designated, respectively, as terminals A0, B0 and C0 for the first winding and terminals A1, B1 and C1 for the second winding. All of the secondary outputs preferably have matched impedances and voltages on a line-to-line and line-to-neutral basis. In addition, all secondary three-phase outputs should have a double current neutral connection, provided by neutral bus 14. This double current neutral must be provided if zero sequence harmonics are present, as these harmonics add directly in the neutral.

Each of the secondary windings in this embodiment is made up of four coils, including output or vector coils 22-27 for the respective phase-shifted outputs and in-phase main secondary coils 18-20. The wye connections for the two secondary outputs are as follows:

Connected to the neutral bus 14 are respective first ends 181, 191, and 201 of each of main secondary coils 18-20 for the three phases. The wye connections are formed by connecting respective second ends 182, 192, and 202 of coils 18-20 to first ends 221, 231, 241, 251, 261, and 271 of the respective pairs 22 and 23, 24 and 25, and 26 and 27 of the secondary vector coils 22-27. The second ends of vector coils 22-27 are respectively connected to output terminals A0-C0 and A1-C1, as shown in FIG. 1.

Vector coils 22-27 are arranged so that the magnetic fluxes induced in the core 4 due to harmonic currents present at secondary outputs A0-C1 will oppose each other, and therefore not induce corresponding currents in the input winding.

Complete magnetic cancellation of current induced fluxes in the core is achieved by phase shifting the secondary winding outputs by 30° for the two output transformer of FIG. 1, and more generally by an amount equal to 60° divided by the number of outputs. This phase shift is a relative shift between the respective outputs of the secondary winding. However, under certain circumstances, it may also be desirable, as will be explained in connection with the embodiment illustrated in FIG. 11, to select a phase shift which does not completely cancel harmonics, but rather which partially cancels certain harmonics.

The reason is that different harmonics have different magnitudes and it may be less important to cancel some than to cancel others.

On the other hand, the primary-to-secondary winding phase shift can have any desired value without affecting harmonic current cancellation, as will be apparent from the following discussion.

The actual phase shift between the multiple secondary windings is determined by three factors. These factors are the harmonic order, degree of cancellation, and the phase sequence. The primary to secondary phase shift $\theta$ is given by the formula $$\theta_h = A_o \pm (h \times A_o) \tag{1}$$

where h is the harmonic order and $A_o$ is the phase shift primary-to-secondary. Whether the phase is ± in equation 1 depends on the phase sequence of the harmonic order. The negative (−) sign is used for negative sequence harmonics and the positive (+) sign is used for positive sequence harmonics.

The table in FIG. 8(a) indicates the phase sequence and primary to secondary phase shifts for each harmonic order of the two output transformer of FIG. 1. Column 1 gives the harmonic order and column 2 gives the phase sequence. Columns 3 and 6 give respective harmonic phase shifts for the first and second outputs. These phase shifts are equal to the second term in equation 1, i.e., $h \times A_o$. Columns 4 and 7 are the total reflected input current phase shift, obtained by adding the initial primary to secondary phase shift $A_o$ to the entry in respective columns 3 and 6. Finally, columns 5 and 8 are equivalent angles to the angles in columns 4 and 7, normalized to be between zero and 360 degrees for illustrative purposes. The sum of columns 4 and 7 or 8 and 9 is given in the last column of Table 1.

It is apparent from FIG. 8(a) that, although $A_o$ is illustratively set at 15° for the first output winding and at 45° for the second output winding, the same results would be obtained for any pair of primary-to-secondary phase shifts, as long as the relative phase shift is 30°. For example, cancellation of harmonics would be equally effective for respective primary-to-secondary phase shifts of 0° and 30°, as shown in FIG. 8(b).

Multiples of the third harmonic order are cancelled out through use of the delta primary winding as noted above. Thus, their values are replaced in the tables by double asterisks. However, in the embodiments shown in FIGS. 8(a) and 8(b), harmonics 11 and 13, 23 and 25, and 35 and 37 are seen to be in the same direction for both outputs and therefore do not cancel.

On the other hand, by simply adding two more secondary windings, relatively phase shifted by 15° as shown in FIG. 10, the 11th, 13th, 35th and 37th orders can be cancelled, and by adding six more windings, all of the first 45 harmonics, at least, may be cancelled. FIGS. 11(a) and 14-15 respectively illustrate the results obtained by three, five, and six output transformers in which the outputs are relatively phase shifted by 60° divided by the number of outputs, for complete cancellation of selected harmonic orders. FIG. 11(b) shows a three output transformer similar to that of FIG. 11(a), but with a shifted primary to secondary phase difference.

Figure 2:
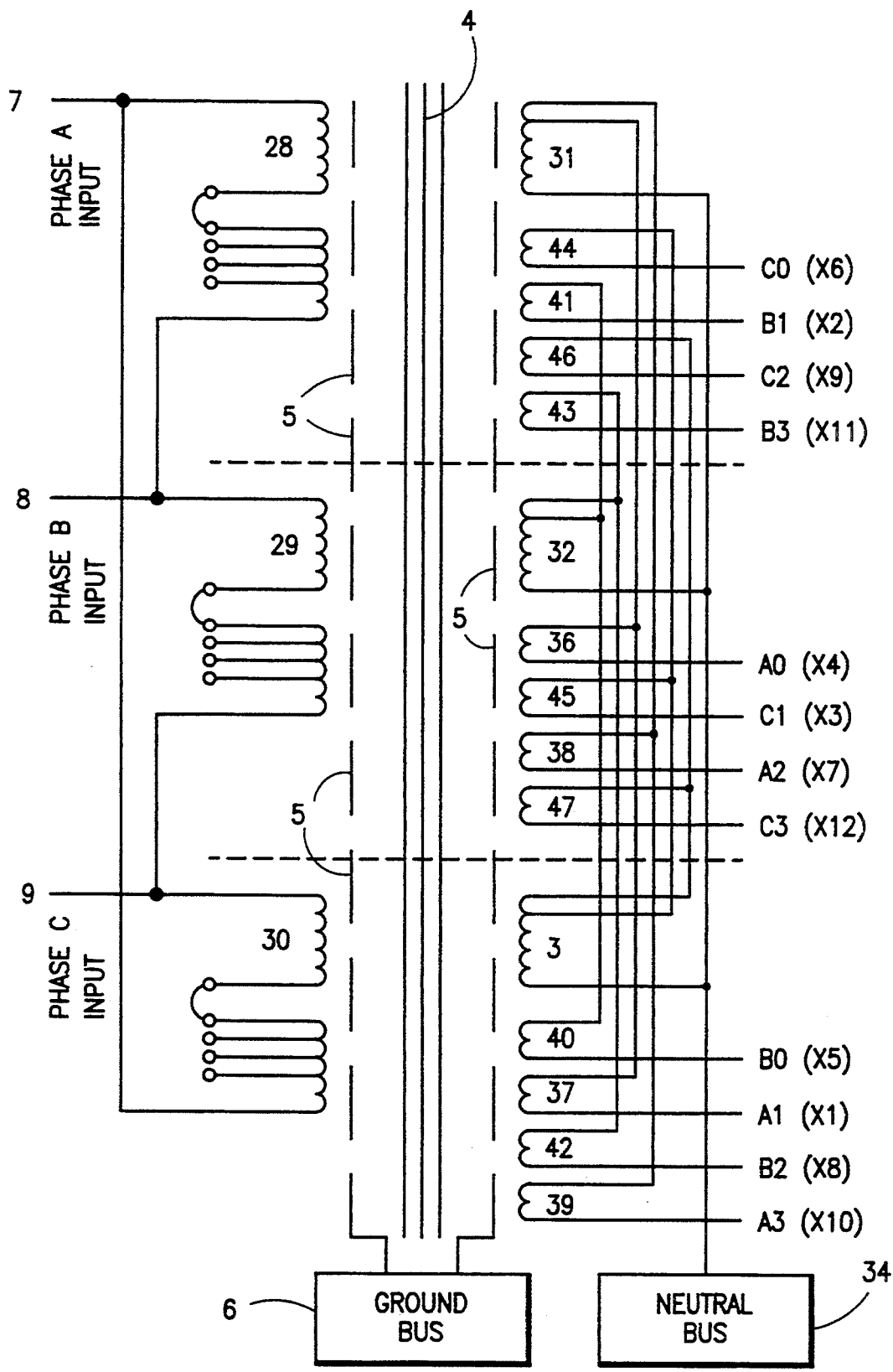
FIG. 2 is a schematic circuit diagram of a transformer having four wye-connected secondary output windings according to another preferred embodiment of the invention.

The wiring for the four output winding version is shown in FIG. 2, and the operation thereof is illustrated by the table of FIG. 10. In this version, the relative phase shift between outputs is 15°, such that output No. 1 is at 15°, output No. 2 is at 30°, output No. 3 is at 45°, and output No. 4 is at 60°. Thus, for the 11th harmonic, there are four outputs at, respectively, −180°, +180°, −180°, and +180°, and thus the outputs cancel.

Optionally, as illustrated, the output voltage for the four output three-phase transformer may be adjusted by adjusting the number of turns in each one of input coils 28-30 so as to match voltages and impedances, but otherwise the four output transformer uses the same delta connected input as the two output transformer. Again, three main secondary coils 31-33 are connected at one end to a neutral bus 34, and wye-connected at second ends, via vector coils 36-47, to the respective phase outputs A0-A3, B0-B3, and C0-C3. For simplicity, the ends of the respective coils are not numbered in FIG. 2.

Figures 4, 5:
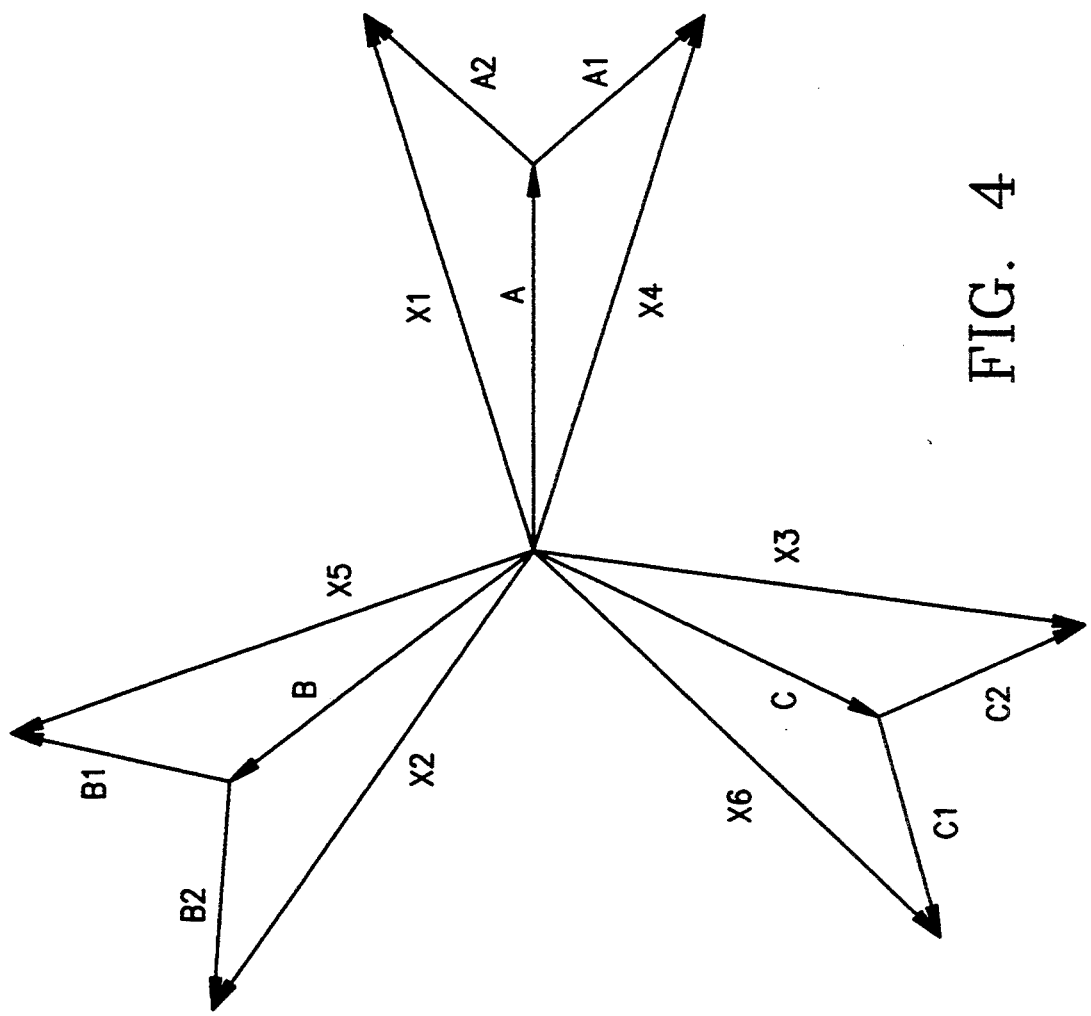
FIG. 4 is a vector diagram showing the relationship of the secondary winding phasors for the preferred dual output transformer of FIG. 1.
FIG. 5 is a table of relative magnitudes and phases for the vector diagram of FIG. 4.
Figure 6:
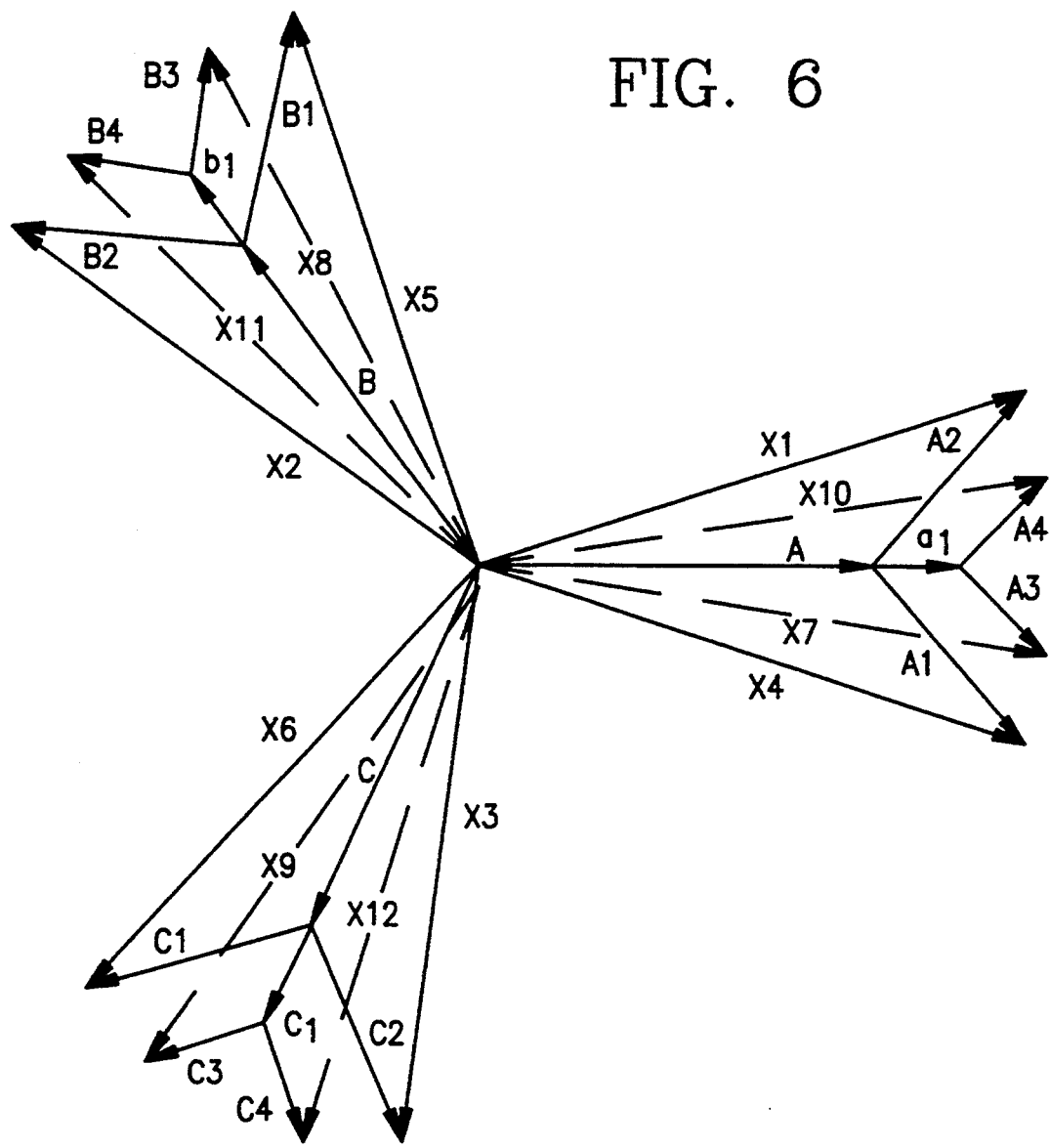
FIG. 6 is a vector diagram showing the relationship of the secondary winding phasors for the four output transformer of FIG. 2.

The operation of the invention can be further understood in reference to the vector or phasor diagrams of FIGS. 4-7. FIG. 4 shows current vectors for the coupling of the primary windings (vectors A, B, and C) and secondary windings (vectors X1-X6) of the two output transformer of FIG. 1. As is apparent from FIG. 4, with output phase A set at zero degrees, and pairs (X1,X4), (X2,X5), and (X3,X6) at relative phase shifts of 30°, difference vectors A1, A2, B1, B2, C1 and C3 add to zero or 360°. The actual relative magnitudes and phase angles for the respective vectors are shown in FIG. 5. In the four output example of FIGS. 6 and 7, similar cancellation is obtained. Although difference vectors A3, A4, B3, B4, C3, and C4 are not shown in FIG. 7, they will also add to 360°.

Figure 3:
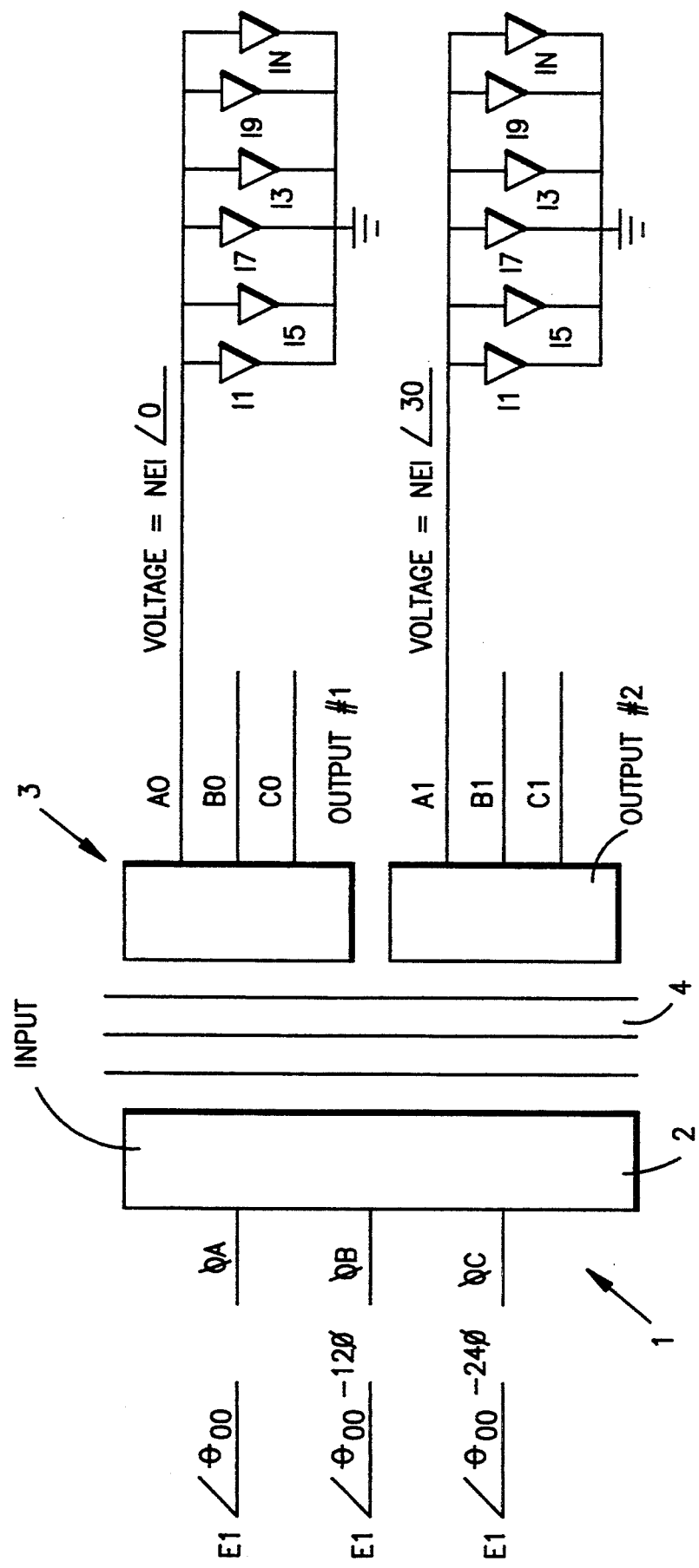
FIG. 3 is an equivalent circuit diagram for the preferred dual output transformer of FIG. 1.

The relationship between voltages and current is shown in FIG. 3, which is equivalent to FIG. 1 but includes a non-linear current load. The input voltages are given by E1, and the two output voltages by NE1, where N is the input-to-output turns ratio. I, I5, ... IN correspond to all possible odd harmonic currents that can be generated in an AC system. I1 is the fundamental current. Output #1 phase A is the reference phase and is assigned a phase shift of zero, which is in phase with fundamental current I1.

Figure 9C:
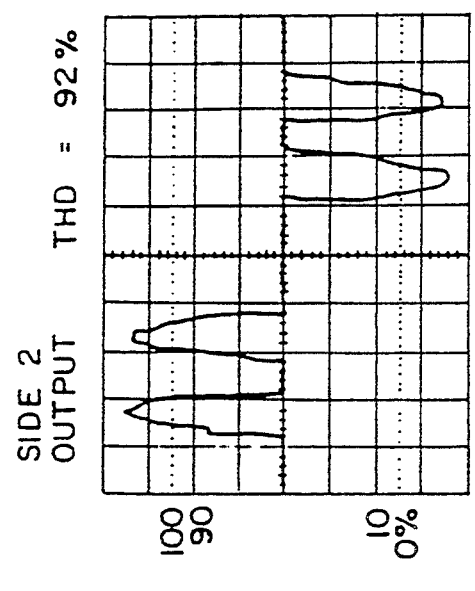
FIGS. 9(a), 9(b), and 9(c) are oscilloscope plots showing the input and outputs for the transformer of FIG. 1 when connected to a non-linear load which causes a total harmonic distortion of greater than 80% in the signal present at the outputs of the transformer.
Figure 9B:
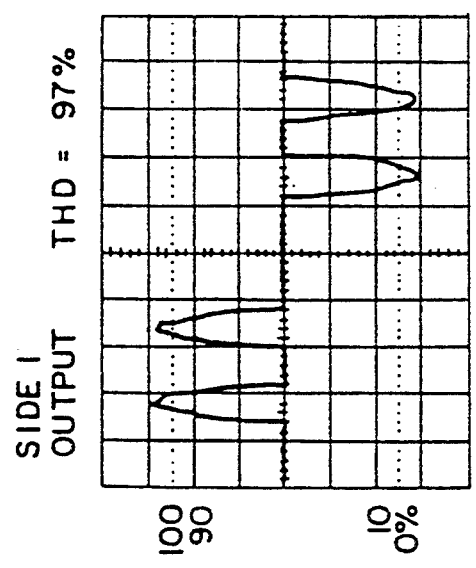
Figure 9A:
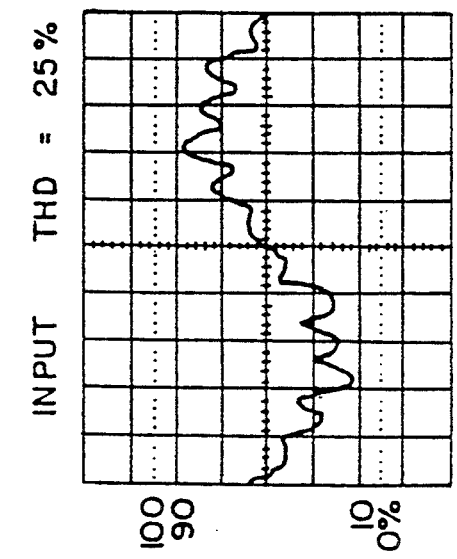
Figure 17:
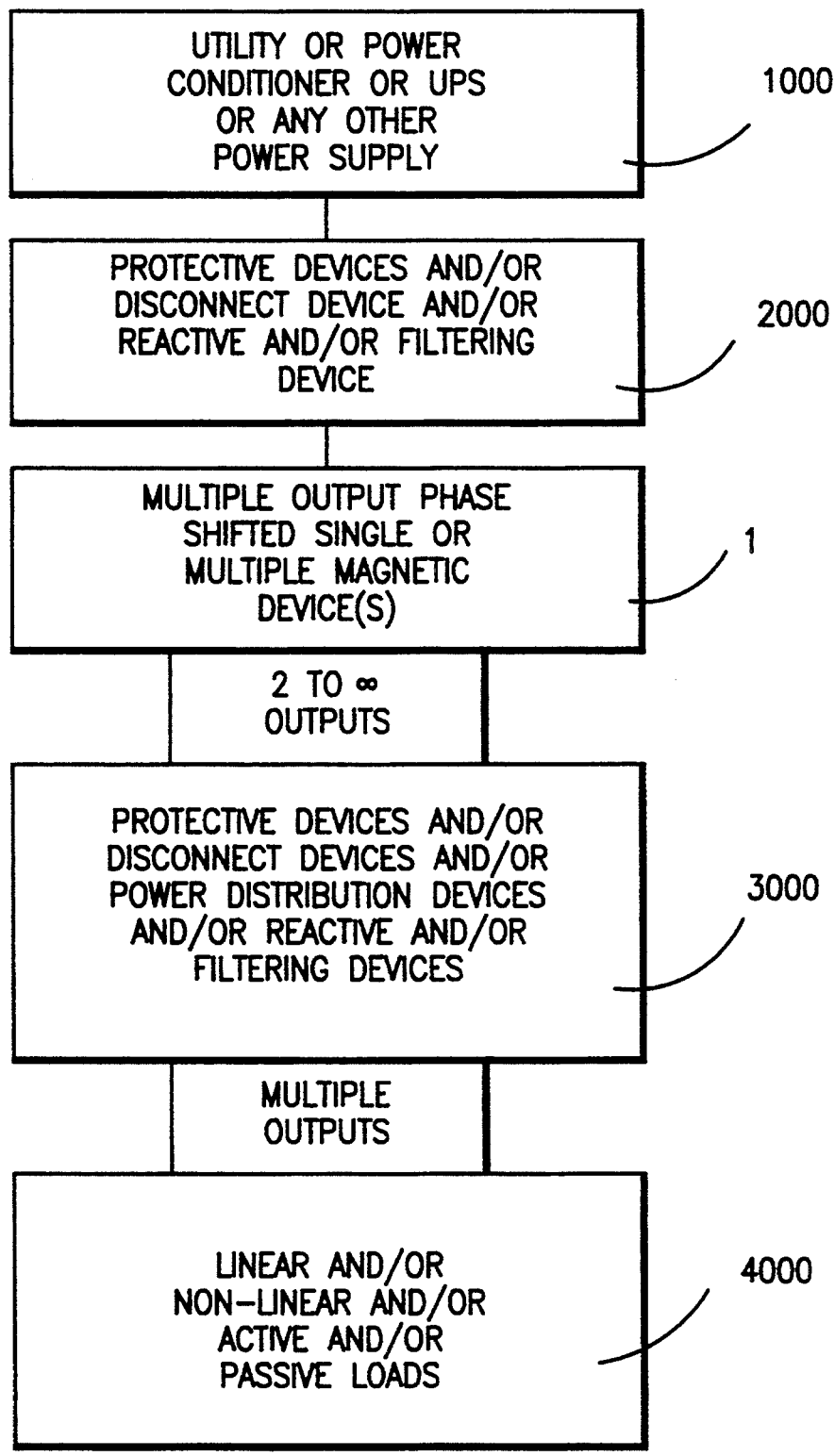
FIG. 17 is a functional block diagram of the manner in which the magnetic cancellation device or transformer of FIGS. 1-16 may be connected in a harmonic cancelling power supply system.
Figure 18:
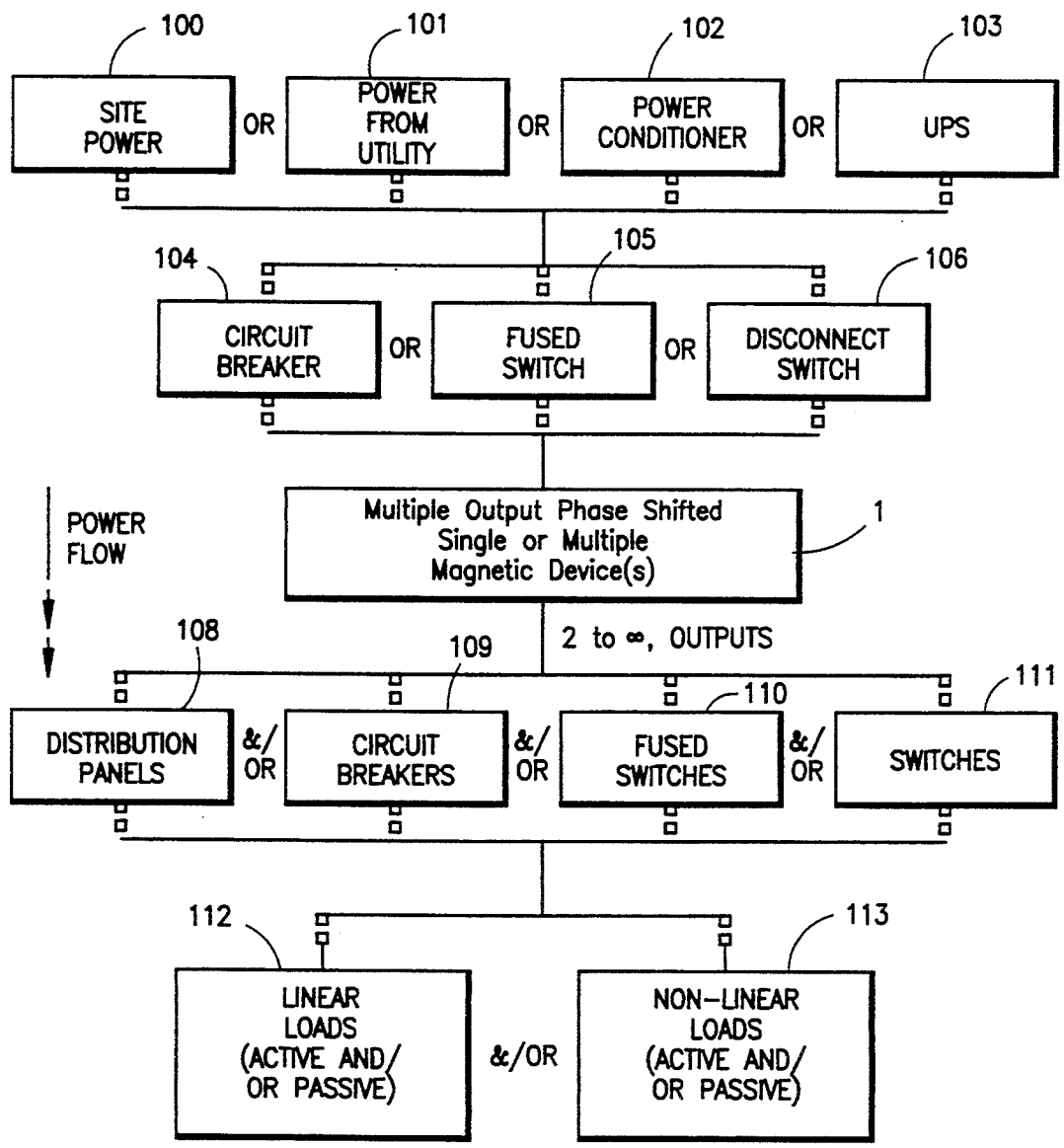
FIG. 18 is a block diagram corresponding to that of FIG. 17, but showing details of the manner in which the preferred magnetic cancellation device or transformer may be connected to a power source and a variety of loads.
Figure 19:
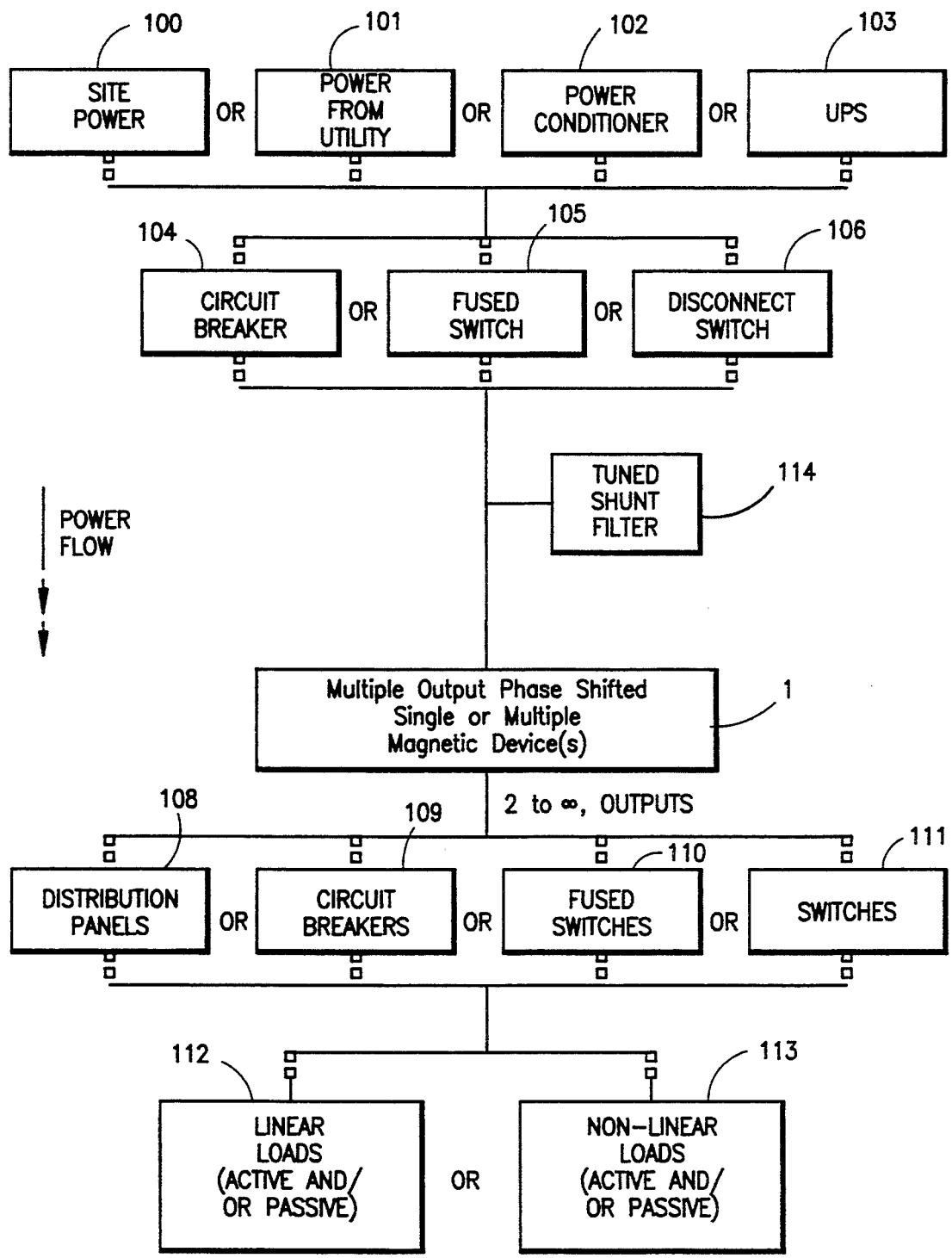
FIG. 19 is a block diagram of a variation of the system of FIG. 18 which includes a tuned shunt filter connected upstream of the magnetic cancellation device.
Figure 20:
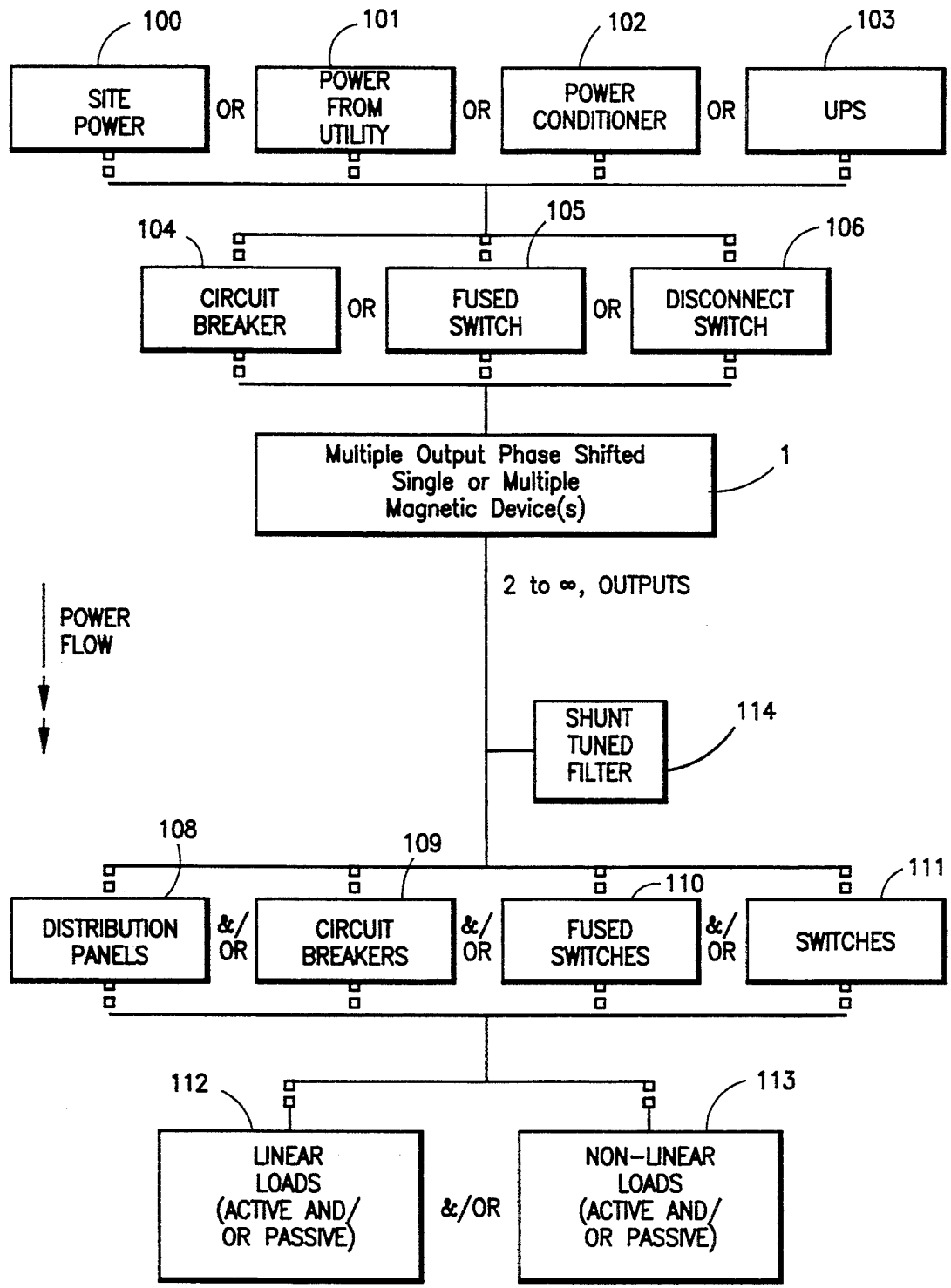
FIG. 20 is a block diagram of a variation of the system of FIG. 18 which includes a shunt tuned filter connected downstream of the magnetic cancellation device.

An oscilloscope plot of the arrangement of FIG. 3 is shown in FIGS. 9(a)-9(c). FIG. 9(a) is a plot of the input side current, while FIGS. 9(b) and 9(c) are plots of the two output side currents connected to loads causing total harmonic distortions (THD) of 97% and 92% respectively. The input side THD is reduced to 25%, a dramatic improvement.

Under certain circumstances, it may also be advantageous to vary the relative phase shifts by amounts other than those described above, i.e., by amounts other than 60° divided by the number of outputs. The result is partial cancellation of selected orders. For example, partial cancellation of the 5th, 7th, 11th, 13th, 15th, and 17th harmonics can be achieved in a two output transformer with a differential secondary phase shift of 18°, as shown in FIG. 12, while different magnitudes of partial cancellation can be achieved by a transformer having two wye connected secondary outputs relatively phase shifted by 7.5°, as shown in FIG. 13.

As is apparent from FIG. 12, by settling for a 50% reduction in the 5th and 7th harmonics, one obtains a 70% reduction in the 11th and 13th harmonics. The fifth and seventh harmonics are not reduced at all in the two output, 30° embodiment of FIG. 8(a). Because the magnitudes of the various harmonic orders may vary with different loads, it is possible that under certain circumstances, the embodiments of FIGS. 12 and 13 may actually be preferable to that of FIGS. 8(a) or 8(b).

The normalized outputs for the embodiments of FIGS. 8(a), 10, 11(a), 14 and 15, as well as that of FIG. 12, are summarized in the table of FIG. 14. It is apparent from FIG. 14 that, by simply increasing the number of outputs, and relatively phase shifting them by 60° divided by the number of outputs, any number of selected harmonics can be caused to completely cancel. Furthermore, FIG. 14 shows the advantages of incomplete cancellation, in the case of the two wye, 18° embodiment, which at least partially cancels a greater number of harmonics than does the two wye 30° embodiment.

Having thus described several specifically preferred embodiments of the invention, it will nevertheless be appreciated that numerous other variations are possible. For example, those skilled in the art will appreciate that the invention may easily be adapted to encompass multiple output transformers having more than six or eight three phase wye connected secondary outputs, so long as the outputs are phase shifted to prevent harmonic currents from appearing at the primary winding inputs. This concept may further be adapted to multiple phase transformers other than three-phase transformers and to multiple transformer configurations. The higher the number of secondaries, the higher the number of harmonic orders that can be cancelled.

Thus, it will be appreciated that the phase shifts and number of secondary windings can be varied as desired depending on the number of harmonic pairs and the degree of attenuation required for the harmonic pairs as noted above.

Each of the preferred transformer or magnetic cancellation device embodiments described above has in common the ability to be used in a wide variety of applications. A number of these applications are indicated in FIGS. 17–20, although it will be appreciated by those skilled in the art that FIGS. 17–20 are, like FIGS. 1–16, not exclusive, and that other applications may occur to those skilled in the art.

As shown in any of FIGS. 17–25, the input power source 1000 for the preferred magnetic cancellation device or transformer can be supplied from a local power source 100, the utility power grid 101, a power conditioner 102 such as a line regulator or motor/alternator, or an uninterruptable power source 103. Before being routed to the magnetic cancellation device, the power may be routed through any or all of the following devices 2000, which are preferably packaged with the magnetic cancellation device in a single unit: protective devices such as a circuit breaker 104, a fused switch 105, or a disconnect switch 106. Each of the outputs of the magnetic cancellation device or transformer 1 can be connected via devices 3000, including distribution panels 108, circuit breakers 109, fuse switches 110, or disconnect switches 111 to a load 4000 in the form of either a linear load 112, which may be either active and/or passive, or a non-linear load 113, which also may be active and/or passive. Magnetic cancellation device 1 may itself, in these embodiments, include multiple transformers on other devices in addition to the basic transformer configuration shown in FIGS. 1–16.

Figure 21:
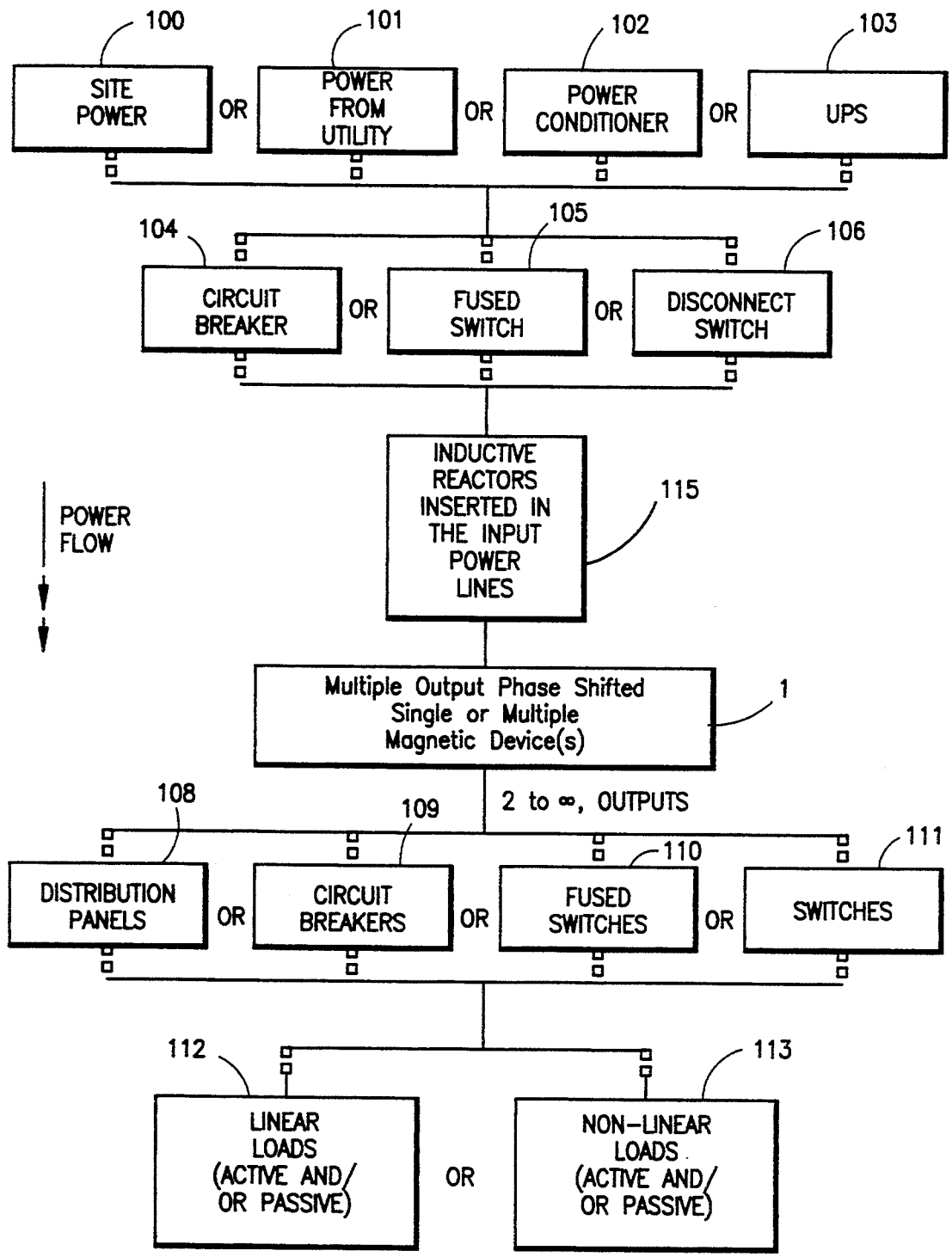
FIG. 21 is a block diagram of a variation of the system of FIG. 18 including inductive reactors inserted in the input power lines.
Figure 22:
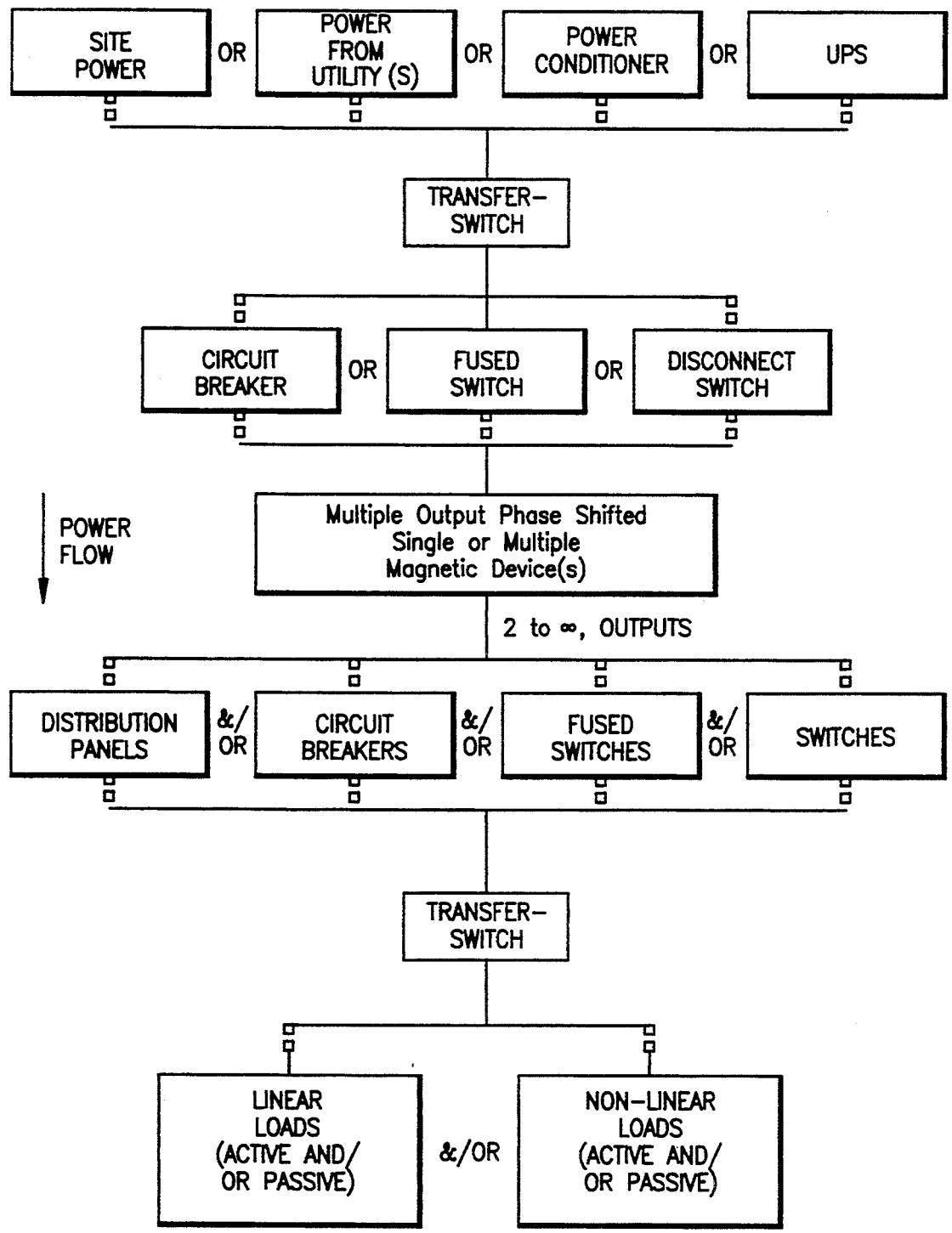
FIG. 22 is a block diagram of a variation of the system of FIG. 18 including transfer switches for a plurality of input sources and multiple active and/or passive linear and/or nonlinear loads.
Figure 23:
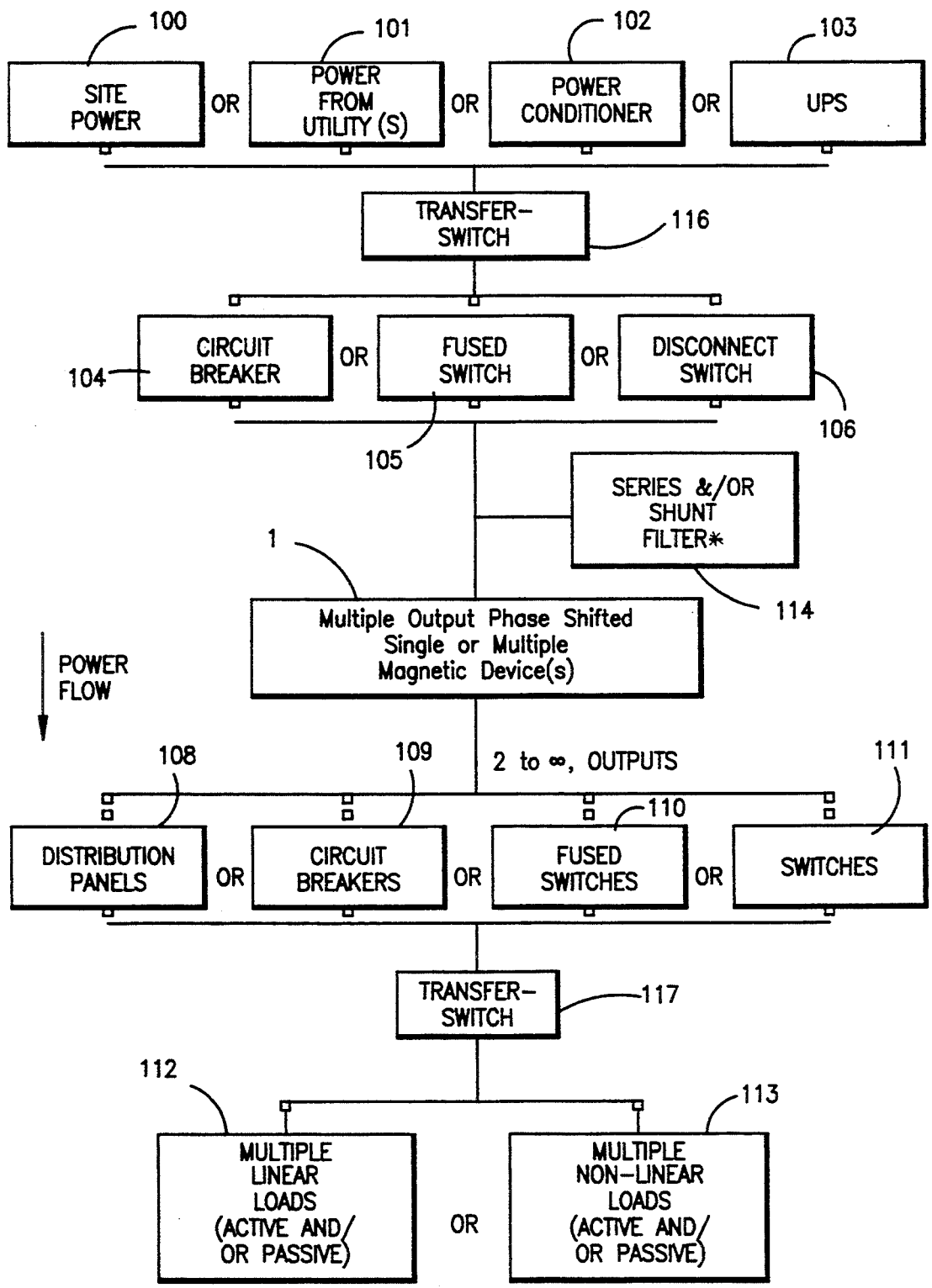
FIG. 23 is a block diagram of a variation of the system of FIG. 22 including a series and/or shunt filter connected upstream of the magnetic cancellation device.
Figure 24:
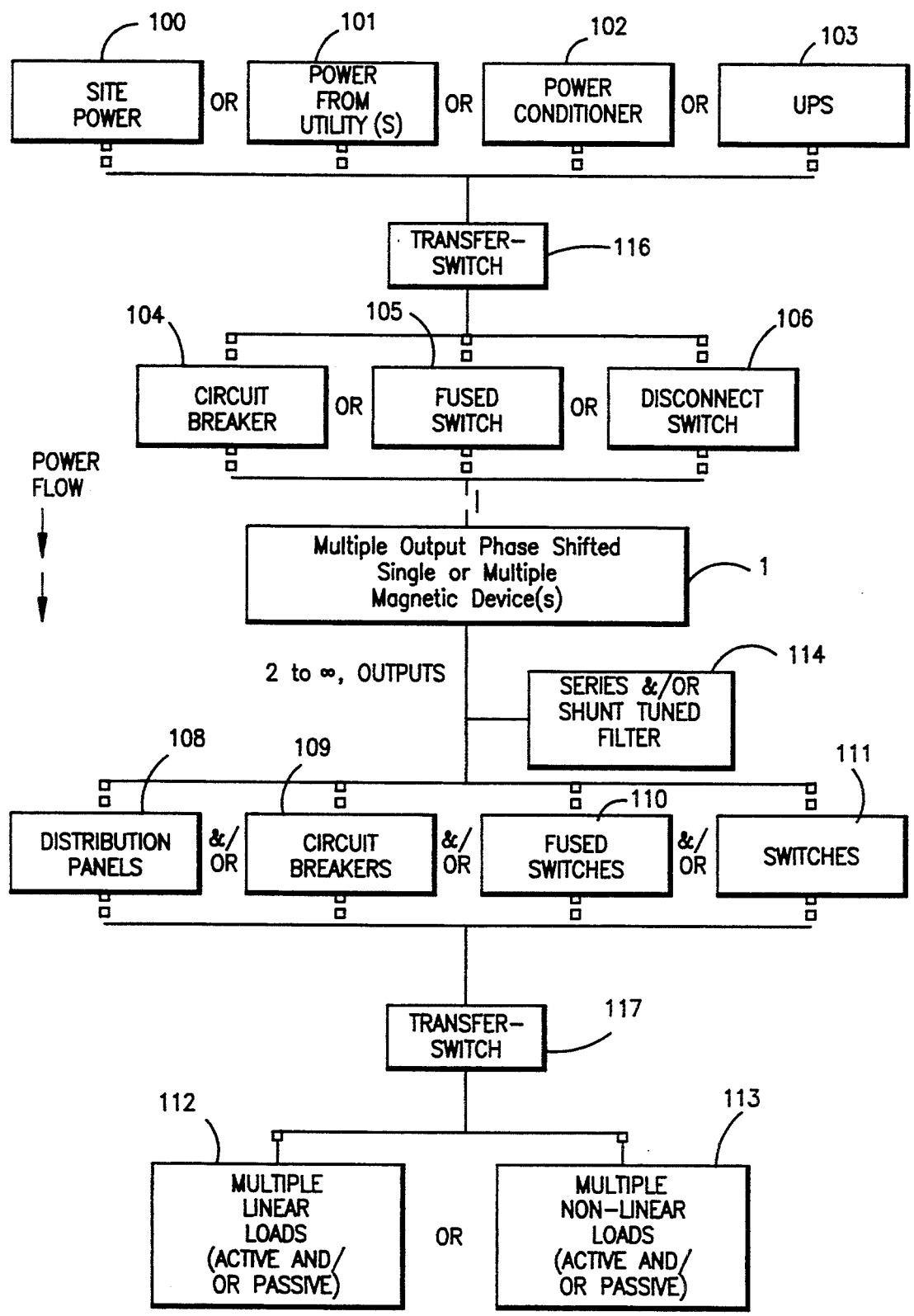
FIG. 24 is a block diagram of a variation of the system of FIG. 22 including a series and/or shunt filter connected downstream of the magnetic cancellation device.
Figure 25:
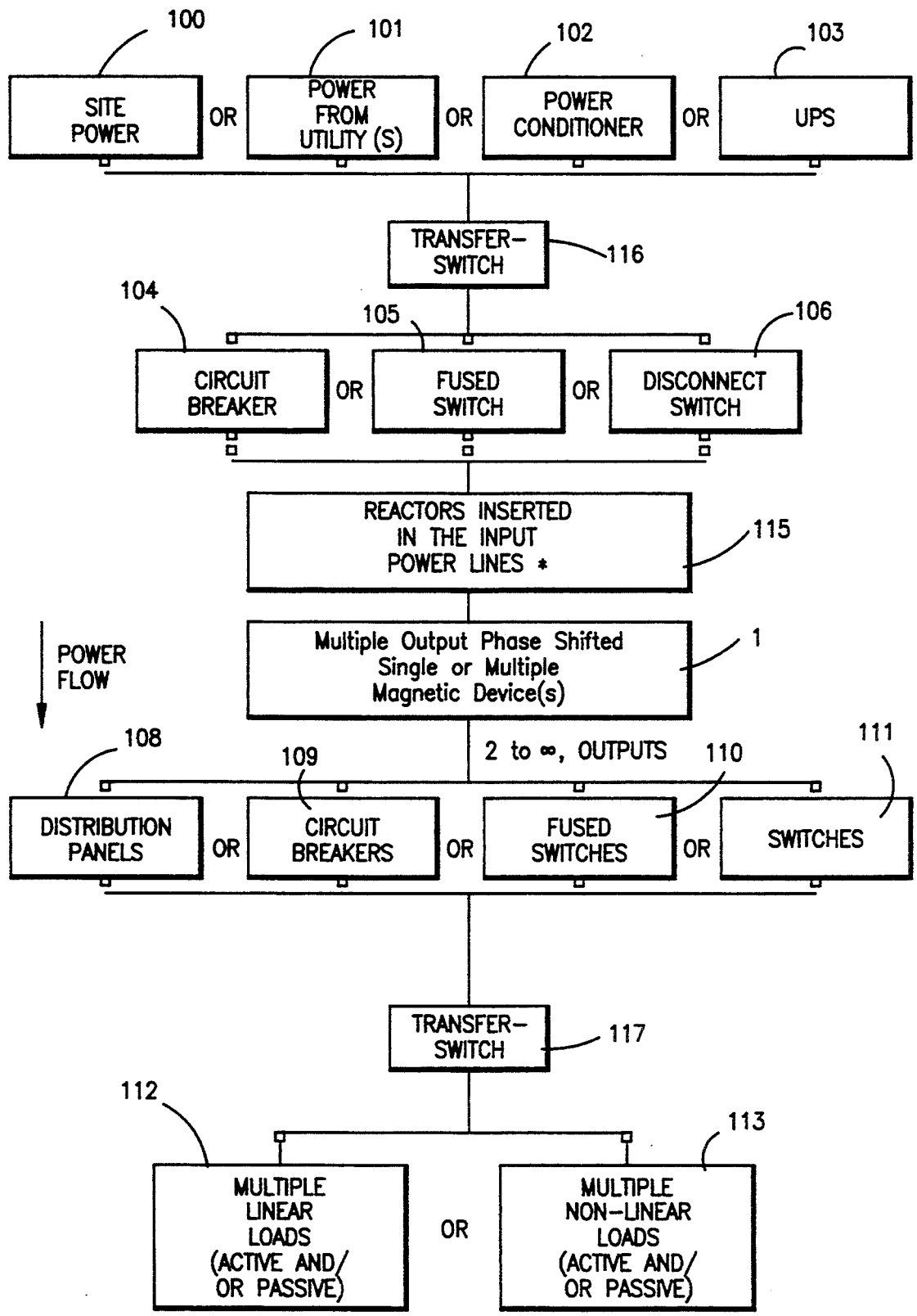
FIG. 25 is a block diagram of a variation of the system of FIG. 22 including reactors inserted in the input power lines to the magnetic cancellation device.

In addition to the above elements, common to FIGS. 17–20, the system may include, as shown in FIGS. 19, 20, 23, and 24, a tuned shunt or series-connected filter 114 at either the input or output of the magnetic cancellation device to reduce total harmonic distortion caused by external sources. Numerous suitable shunt filters are known, including diode, varistor, and capacitor based circuits, depending on the frequencies, currents, and/or voltages of the signals or transients to be filtered. As shown in FIGS. 21 and 25, the system may also include inductive reactors 115 inserted in the input power line for reducing the input current total harmonic distortion (THD). For example, reactor devices are known which are capable of reducing THD by a factor of up to two for high harmonic loads. Finally, as shown in FIGS. 23–25, the system may include manual or automatic transfer switches 116 and 117, using semiconductors or other devices, for switching respectively between different power sources and loads.

Applications of the system can include, in addition to those noted above, use in fixed and/or mobile power distribution units, fixed and/or mobile harmonic cancellation units, as a load linearizer to isolate nonlinear leads from other equipment, as a power factor correction device, as a KVA conservation device (the power factor correction generally makes the input KVA less than the output KVA, although the input KW is greater than the output KW), as an AC-to-DC convertor for supplying DC loads or to charge batteries and/or capacitors, and as one of a number of redundant or switched redundant units or unit sub-assemblies for high mean time between failures (MTBF) sites or configurations.

Finally, in view of the numerous variations of the invention which are likely to occur to those skilled in the art, it is again noted, as those skilled in the art will understand, that the alcove description is not to be construed as limiting, but rather than the invention be defined solely by the appended claims.

I claim:

1. In a transformer which includes a transformer core, a three-phase primary winding inductively coupled with the core, and at least two three-phase wye-connected output windings inductively coupled with said core, the improvement wherein:
    the two three-phase wye-connected output windings include an in-phase coil and vector coils for each of said phases, one of said in-phase coils for a first of said phases being connected between a common neutral and two vector coils corresponding respectively to the remaining two phases, the two vector coils being connected to separate output terminals, thereby phase shifting the output windings relative to each other to thereby cause magnetic flux vectors generated in the core by harmonic currents present in the output windings to add to zero for respective orders of selected harmonic currents and thereby prevent the selected harmonic currents present in the output windings from being induced in the input winding.

2. A transformer as claimed in claim 1, wherein said output windings comprise two three-phase wye-connected output windings, said two output windings having a relative phase shift of 30°.

3. A transformer as claimed in claim 1, wherein said output windings comprise four three-phase output windings, said four output windings having a relative phase shift of 15°.

4. A transformer as claimed in claim 1, wherein said terminals are connected to multiple loads.

5. A transformer as claimed in claim 4, wherein said multiple loads include at least one nonlinear load.

6. A transformer as claimed in claim 1, comprising twelve of said output terminals and four of said three-phase output windings.

7. A transformer as claimed in claim 1, wherein the relative phase shift between said output windings is equal to 60° divided by the number of said output windings.

8. A transformer as claimed in claim 1, wherein said output windings comprise three three-phase output windings, said three output windings having a relative phase shift of 20°.

9. A transformer as claimed in claim 1, wherein said output windings comprise five three-phase output windings, said five output windings having a relative phase shift of 12°.

10. A transformer as claimed in claim 1, wherein said output windings comprise six three-phase output windings, said six output windings having a relative phase shift of 10°.

11. A power system, comprising:

a power supply;

a single transformer core;

a three-phase primary winding inductively coupled with said core;

at least two three-phase wye-connected principal output windings inductively coupled with said core and electrically connected to three output terminals for each of said output windings, a first end of an in-phase main secondary coil being directly connected to a neutral bus, a second end of said main secondary coil being connected to a first end of each of at least two vector coils, and a second end of each of said at least two vector coils being connected to one of said terminals, wherein said output windings are thereby arranged to cause magnetic flux vectors generated in said core by harmonic currents present in the output windings to add to zero for respective orders of selected harmonic currents and thereby prevent the selected harmonic currents present in the output windings from being induced in said input windings.

12. A power system as claimed in claim 11, wherein said power supply is an electric utility.

13. A power system as claimed in claim 11, wherein said power supply includes a power conditioner.

14. A power system as claimed in claim 11, wherein said power supply is an uninterruptable power supply.

15. A power system as claimed in claim 11, further comprising at least one protective device connected between the power supply and the primary winding.

16. A power system as claimed in claim 15, wherein said at least one protective device is selected from the group consisting of a circuit breaker and a fused switch.

17. A power system as claimed in claim 11, further comprising a disconnect device connected between the power supply and the primary winding.

18. A power system as claimed in claim 11, further comprising a reactive device inserted into an input power line to the primary winding.

19. A power system as claimed in claim 11, further comprising a filtering device connected between the power supply and the primary winding.

20. A power system as claimed in claim 19, wherein said filtering device is a tuned filter.

21. A power system as claimed in claim 19, wherein said filtering device is a shunt connected filter.

22. A power system as claimed in claim 19, wherein said filtering device is a series connected filter.

23. A power system as claimed in claim 11, further comprising at least one protective device connected between said terminals and a load.

24. A power system as claimed in claim 23, wherein said at least one protective device is selected from the group consisting of a circuit breaker and a fused switch.

25. A power system as claimed in claim 11, further comprising a disconnect device connected between said terminals and a load.

26. A power system as claimed in claim 11, further comprising a power distribution panel connected between said terminals and multiple loads.

27. A power system as claimed in claim 11, further comprising a reactive device inserted into an input power line to a system output.

28. A power system as claimed in claim 11, further comprising a filtering device connected between the power supply and a system output.

29. A power system as claimed in claim 28, wherein said filtering device is a tuned filter.

30. A power system as claimed in claim 28, wherein said filtering device is a shunt connected filter.

31. A power system as claimed in claim 28, wherein said filtering device is a series connected filter.

32. A power system as claimed in claim 11, wherein said terminals are connected to at least a linear load.

33. A power system as claimed in claim 11, wherein said terminals are connected to at least a nonlinear load.

34. A power system as claimed in claim 11, further comprising a transfer switch connected between said terminals and a load.

35. A power system as claimed in claim 34, wherein said transfer switch is connected between multiple linear and nonlinear, active and passive loads.

36. A harmonic cancelling power system, comprising:

a power supply;

a single transformer core;

a three-phase primary winding inductively coupled with said core;

at least two three-phase wye-connected principal output windings inductively coupled with said core and electrically connected between a common central and three output terminals for each of said output windings, wherein said output windings are thereby arranged to cause magnetic flux vectors generated in said core by harmonic currents present in the output windings to add to zero for respective orders of selected harmonic currents and thereby prevent he selected harmonic currents present in the output windings from being induced in said input windings without the need for additional output windings or electrical components.

37. A power system as claimed in claim 36, wherein said power supply is an electric utility.

38. A power system as claimed in claim 36, wherein said power supply includes a power conditioner.

39. A power system as claimed in claim 36, wherein said power supply is an uninterruptable power supply.

40. A power system as claimed in claim 36, further comprising at least one protective device connected between the power supply and the primary winding.

41. A power system as claimed in claim 40, wherein said at least one protective device is selected from the group consisting of a circuit breaker and a fused switch.

42. A power system as claimed in claim 36, further comprising a disconnect device connected between the power supply and the primary winding.

43. A power system as claimed in claim 36, further comprising a reactive device inserted into an input power line to the primary winding.

44. A power system as claimed in claim 36, further comprising a filtering device connected between the power supply and the primary winding.

45. A power system as claimed in claim 44, wherein said filtering device is a tuned filter.

46. A power system as claimed in claim 44, wherein said filtering device is a shunt connected filter.

47. A power system as claimed in claim 44, wherein said filtering device is a series connected filter.

48. A power system as claimed in claim 36, further comprising at least one protective device connected between said terminals and a load.

49. A power system as claimed in claim 48, wherein said at least one protective device is selected from the group consisting of a circuit breaker and a fused switch.

50. A power system as claimed in claim 36, further comprising a disconnect device between said terminals and a load.

51. A power system as claimed in claim 36, further comprising a power distribution panel connected between said terminals and multiple loads.

52. A power system as claimed in claim 36, further comprising a reactive device inserted into an input power line to a system output.

53. A power system as claimed in claim 36, further comprising a filtering device connected between the power supply and a system output.

54. A power system as claimed in claim 53, wherein said filtering device is a tuned filter.

55. A power system as claimed in claim 53, wherein said filtering device is a shunt connected filter.

56. A power system as claimed in claim 53, wherein said filtering device is a series connected filter.

57. A power system as claimed in claim 36, wherein said terminals are connected to at least a linear load.

58. A power system as claimed in claim 36, wherein said terminals are connected to at least a nonlinear load.

59. A power system as claimed in claim 36, further comprising a transfer switch connected between said terminals and a load.

60. A power system as claimed in claim 59, wherein said transfer switch is connected between multiple linear and nonlinear, active and passive loads.

* * * * *